US012704684B2

(12) United States Patent
Shimizu et al.

(10) Patent No.: US 12,704,684 B2
(45) Date of Patent: Aug. 11, 2026

(54) IMAGE DISPLAY APPARATUS AND IMAGE DISPLAY METHOD

(71) Applicant: SONY GROUP CORPORATION, Tokyo (JP)

(72) Inventors: Kazue Shimizu, Kanagawa (JP); Nobuhiro Kihara, Kanagawa (JP); Christophe Peroz, Tokyo (JP)

(73) Assignee: Sony Group Corporation, Tokyo (JP)

( * ) Notice: Subject to any disclaimer, the term of this patent is extended or adjusted under 35 U.S.C. 154(b) by 173 days.

(21) Appl. No.: 18/554,049

(22) PCT Filed: Jan. 26, 2022

(86) PCT No.: PCT/JP2022/002748

§ 371 (c)(1),
(2) Date: Oct. 5, 2023

(87) PCT Pub. No.: WO2022/219873

PCT Pub. Date: Oct. 20, 2022

(65) Prior Publication Data

US 2024/0201443 A1 Jun. 20, 2024

(30) Foreign Application Priority Data

Apr. 16, 2021 (JP) ................................ 2021-070026

(51) Int. Cl.
*G02B 6/34* (2006.01)
*G02B 6/26* (2006.01)
*G02B 27/00* (2006.01)

(52) U.S. Cl.
CPC .............. *G02B 6/34* (2013.01); *G02B 6/262* (2013.01); *G02B 27/0081* (2013.01)

(58) Field of Classification Search
CPC ....... G02B 6/34; G02B 27/0081; G02B 6/262
See application file for complete search history.

(56) References Cited

U.S. PATENT DOCUMENTS 9,465,213 B2 * 10/2016 Simmonds ......... G02B 27/0172
10,534,176 B1 * 1/2020 Chi .................... G02B 27/0081
(Continued)

FOREIGN PATENT DOCUMENTS

JP 2014-142386 8/2014
WO WO 2019/155117 8/2019
WO WO 2020/217044 10/2020

OTHER PUBLICATIONS

International Search Report and Written Opinion prepared by the Japan Patent Office on Mar. 28, 2022, for International Application No. PCT/JP2022/002748, 2 pgs.

*Primary Examiner* — Eric Wong
(74) *Attorney, Agent, or Firm* — SHERIDAN ROSS P.C.

(57) ABSTRACT

An image display apparatus capable of achieving uniform image quality while improving the use efficiency of incident light, including: an image forming unit that emits image light and converts the image light into parallel light for an angle of view; a light guide plate that allows the image light converted by the image forming unit to enter, to travel inside the light guide plate, and to be emitted outward from the light guide plate; a first diffraction grating in the light guide plate that diffracts the image light and causes the image light to travel inside the light guide plate; a second diffraction grating in the light guide plate that diffracts the image light traveling inside the light guide plate and emits the image light outward from the light guide plate; and a recycler diffraction grating that diffracts and recycles the image light emitted from the second diffraction grating.

19 Claims, 38 Drawing Sheets

(56) References Cited

U.S. PATENT DOCUMENTS

2016/0231566 A1* 8/2016 Levola .................... G02B 6/00
2016/0327705 A1* 11/2016 Simmonds ......... G02B 27/0081
2018/0003994 A1 1/2018 Grey et al.
2018/0172995 A1 6/2018 Lee et al.
2018/0299678 A1 10/2018 Singer et al.
2023/0258943 A1* 8/2023 Luo .................... G02B 27/0172
345/7

* cited by examiner

K-space

IN
Recycler5
Recycler4
Ex1
Recycler3
Ex2
Recycler2
Recycler1-1
Recycler1-2

Recycler6
IN
Recycler5
Recycler4
Ex1
Ex2
Recycler3
Recycler2
Recycler1-1
Recycler1-2

K-space

Recycler5-2
Recycler5-1
IN
Recycler4-2
Recycler4-1
Ex1
Ex2
Recycler3
Recycler2
Recycler1-1
Recycler1-2

Recycler5
IN
Recycler4
Ex1
Recycler3
Recycler2
Ex2
Recycler1-1
Recycler1-2

Recycler5 IN Recycler4

Ex1

Recycler3 Recycler2

Ex2

Recycler1-1

Recycler1-2

Recycler5
IN
Recycler4
Ex1
Recycler3
Recycler2
Ex2
Recycler1-1
Recycler1-2

K-space

Recycler5
IN
Recycler4
Ex1
Recycler3
Recycler2
Ex2
Recycler1-1
Recycler1-2

Recycler5-2
Recycler4-2
Recycler5-1
IN
Recycler4-1
Ex1
Recycler3-2
Recycler3-1
Ex2
Recycler2-1
Recycler2-2
Recycler1-1
Recycler1-2

Recycler6
Ex1
Ex2
Ex2
Ex1
Ex1
Ex2
Recycler3
Recycler2
IN
Ex2
Ex1
Recycler1-1
Recycler1-2

K-space

FIG. 31A
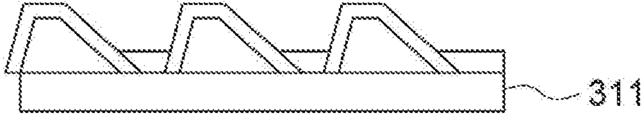
FIG. 31B
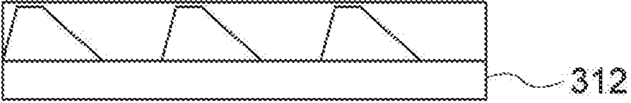
FIG. 31C
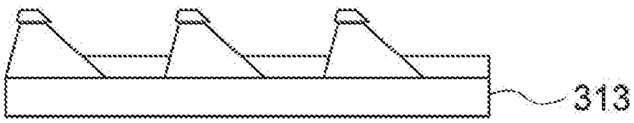
FIG. 31D
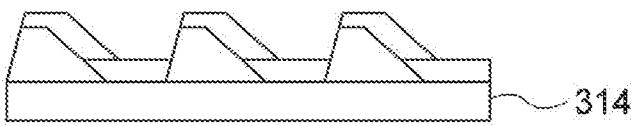
FIG. 31E
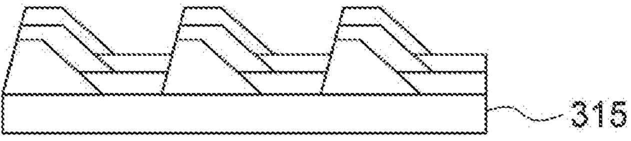

FIG. 33A
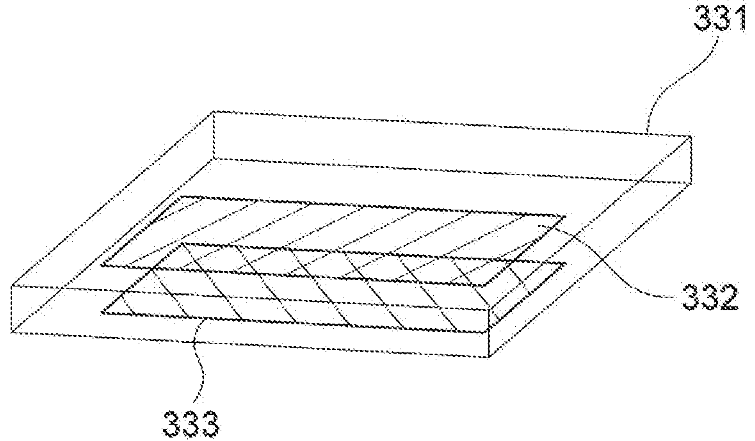
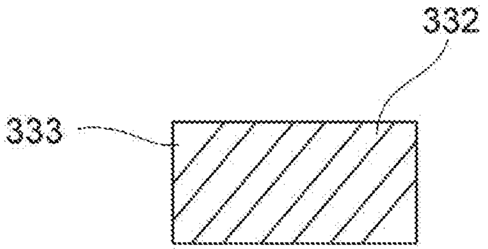
FIG. 33B 331
351
352

Recycler84
IN
Ex1
Recycler83
Recycler82
Ex2
Recycler81

IMAGE DISPLAY APPARATUS AND IMAGE DISPLAY METHOD

CROSS REFERENCE TO RELATED APPLICATIONS

This application is a national stage application under 35 U.S.C. 371 and claims the benefit of PCT Application No. PCT/JP2022/002748, having an international filing date of 26 Jan. 2022, which designated the United States, which PCT application claimed the benefit of Japanese Patent Application No. 2021-070026, filed 16 Apr. 2021, the entire disclosures of each of which are incorporated herein by reference.

TECHNICAL FIELD

The present technology relates to an image display apparatus and an image display method. More specifically, the present technology relates to an image display apparatus and an image display method for displaying an image by using a light guide plate having a diffraction grating.

BACKGROUND ART

Conventionally, there is known an image display apparatus (eyewear) using a hologram diffraction grating for changing a two-dimensional image formed by an image forming unit into a virtual image enlarged by a virtual-image optical system and providing it as a color image to an observer, a user.

For example, Patent Literature 1 has proposed an image display apparatus as a light guide plate type AR glass system. The image display apparatus includes an optical device. The optical device includes an image forming unit that emits image light, a light guide member having a light input surface and a light output surface, a first diffractive optical element positioned between the light input surface of the light guide member and the image forming unit, and a reflective layer held in contact with a portion different from the light input surface of the light guide member. The image light becomes diffracted image light when the first diffractive optical element diffracts at least part of the image light. At least part of the diffracted image light enters the light guide member from the light input surface of the light guide member. The reflective layer is provided at a position irradiated with at least part of the diffracted image light entering the light guide member.

Moreover, Patent Literature 2 has proposed an eyepiece waveguide as a light guide plate type AR glass system. The eyepiece waveguide includes one or more diffraction mirrors arranged in the periphery of a light guide plate substrate.

Moreover, Patent Literature 3 has proposed an augmented reality device including an input diffractive optical element, an output diffractive optical element, and a returning diffractive optical element. The input diffractive optical element is arranged in or on a waveguide configured to receive light from a projector and couple the light into a waveguide so that it is captured in the waveguide by total internal reflection. The output diffractive optical element is arranged in or on the waveguide configured to couple totally internally reflected light from the waveguide toward a user. The returning diffractive optical element is arranged in or on the waveguide configured to receive light from the output diffractive optical element and diffract the received light so that it is returned toward the output diffraction.

CITATION LIST

Patent Literature

Patent Literature 1: Japanese Patent Application Laid-open No. 2014-142386

Patent Literature 2: US Patent Application Laid-open No. 2018/0003994

Patent Literature 3: WO 2020/217044

DISCLOSURE OF INVENTION

Technical Problem

Here, the technology of Patent Literature 1 uses a combination of a pair of diffraction gratings with the same pitch as a light-incidence diffraction grating and an exit-side diffraction grating in a light guide plate, a light guide plate with a reflection surface at an end surface of the light guide plate, and an optical engine that makes a video. This controls both angular selectivity and wavelength selectivity of the diffraction gratings while improving the design as an eyewear by tilting incident light beams inward by reflection. The technology of Patent Literature 1 is an effective method for a volume hologram with high selectivity. However, such an angle change by the reflection mirror is unnecessary for a surface-relief hologram because of its low selectivity. Moreover, the technology of Patent Literature 1 has problems in that the presence of the mirror darkens the image depending on the reflectance and it cannot be applied in a case where the light incident angle is 0 degrees. In addition, the technology of Patent Literature 1 also has a problem in that if this method is applied for recycling undiffracted, zero-order light, all reflected light rays become ghosts, which are not useful at all or rather troublesome sometimes.

Moreover, as to the technology of Patent Literature 2, light beams are not sufficiently returned in a two-dimensional surface-relief diffraction grating (SRG) structure. Therefore, it is necessary to draw vectors not passing through the center as vectors for returning the light beams. Thus, the technology of Patent Literature 2 needs to be further improved for the use as the light guide plate type AR glass system.

Moreover, the technology of Patent Literature 3 cannot solve problems related to an angle of view, uniformity, and an efficiency improvement because Patent Literature 3 has disclosed only concepts, not specific methods. Moreover, it is necessary to place a diffraction grating above an IN diffraction grating in order to improve the uniformity and efficiency. In addition, it is desirable to apply coatings on the diffraction gratings in order to improve the diffraction efficiency. In this regards, a metal coating is more desirable than a high-refractive index coating for the material because it is stable in terms of tolerance sensitivity in film deposition. However, it is difficult to actually use it because of an appearance problem, e.g., a problem in that the coating is visible on a lens.

In view of this, it is a main object of the present technology to provide an image display apparatus capable of achieving uniform image quality while improving the use efficiency of incident light.

Solution to Problem

The present technology provides an image display apparatus including: an image forming unit that emits image light and converts the image light into parallel light for an angle of view; a light guide plate that allows the image light converted by the image forming unit to enter the light guide plate, to travel inside the light guide plate, and to be emitted outward from the light guide plate; a first diffraction grating that is arranged in the light guide plate and diffracts the image light entering the light guide plate and causes the image light to travel inside the light guide plate; a second diffraction grating that is arranged in the light guide plate and diffracts the image light traveling inside the light guide plate and emits the image light outward from the light guide plate; and a recycler diffraction grating that diffracts and recycles the image light emitted from the second diffraction grating.

The present technology also provides an image display method including: a step of emitting image light; a step of causing the emitted image light to enter a light guide plate; a step of diffracting the image light entering the light guide plate and causing the image light to travel inside the light guide plate; a step of diffracting the image light traveling inside the light guide plate and emitting the image light outward from the light guide plate; and a step of recycling the image light traveling inside the light guide plate and emitting the image light outward from the light guide plate.

Advantageous Effects of Invention

In accordance with the present technology, an image display apparatus capable of achieving uniform image quality while improving the use efficiency of incident light can be provided. It should be noted that the above-mentioned effects are not limitative and any one of the effects set forth in the present specification or other effects that can be conceived from the present specification may be provided in addition to or instead of the above-mentioned effects.

BRIEF DESCRIPTION OF DRAWINGS

FIGS. 31A-31E Are schematic diagrams showing configuration examples of a diffraction grating surface according to a ninth embodiment of the present technology.

FIGS. 33A and 33B Are schematic diagrams showing a configuration example of diffraction gratings according to an eleventh embodiment of the present technology.

FIGS. 46A and 46B Are schematic diagrams showing a configuration example of an image display apparatus including diffraction gratings according to a twentieth embodiment of the present technology.

MODE(S) FOR CARRYING OUT THE INVENTION

Hereinafter, favorable embodiments for carrying out the present technology will be described with reference to the drawings. The embodiments described below represent examples of typical embodiments of the present technology and any embodiments can be combined. Moreover, the scope of the present technology should not be understood narrowly due to them. It should be noted that descriptions will be given in the following order.

1. First Embodiment
(1) Configuration Example of Image Display Apparatus
(2) Configuration Example of Diffraction Gratings
(3) Example of Image Display Method
(4) Modified Example of Diffraction Gratings
2. Second Embodiment
(1) Configuration Example of Diffraction Gratings
(2) Modified Examples of Diffraction Gratings
3. Third Embodiment
(1) Configuration Example of Diffraction Gratings
(2) Modified Examples of Diffraction Gratings
(3) Effects of Recycler Diffraction Gratings
4. Fourth Embodiment
(1) Configuration Example of Diffraction Gratings
(2) Modified Examples of Diffraction Gratings
5. Fifth Embodiment
6. Sixth Embodiment
7. Seventh Embodiment
8. Eighth Embodiment
9. Ninth Embodiment
10. Tenth Embodiment
11. Eleventh Embodiment
12. Twelfth Embodiment
13. Thirteenth Embodiment
14. Fourteenth Embodiment
15. Fifteenth Embodiment
16. Sixteenth Embodiment
17. Seventeenth Embodiment
(1) Configuration Example of Diffraction Gratings
(2) Modified Examples of Diffraction Gratings
18. Eighteenth Embodiment
19. Nineteenth Embodiment
20. Twentieth Embodiment
21. Twenty-First Embodiment

1. First Embodiment (1) Configuration Example of Image Display Apparatus

Figure 1:
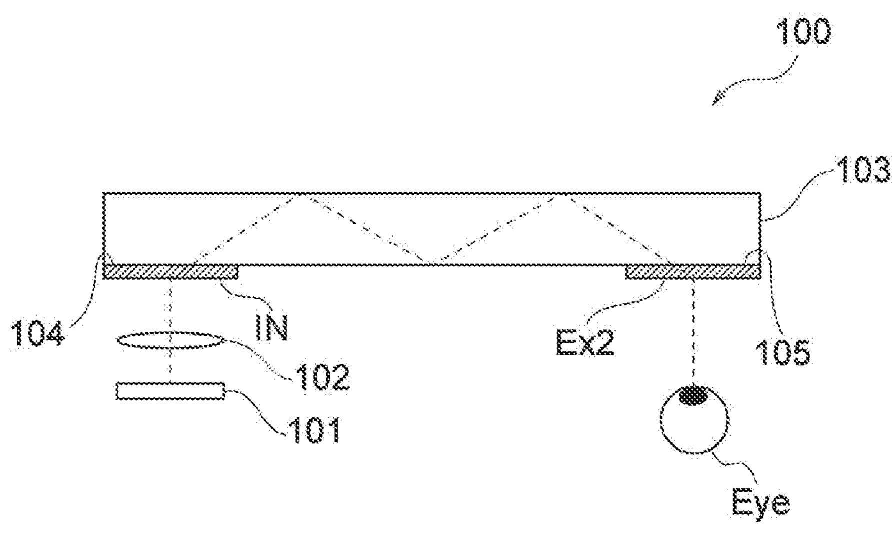
FIG. 1 A schematic configuration diagram of an image display apparatus according to a first embodiment of the present technology as viewed from above.

First of all, a configuration example of an image display apparatus according to a first embodiment of the present technology will be described with reference to FIG. 1. FIG. 1 is a schematic configuration diagram of an image display apparatus 100 according to the present embodiment as viewed from above.

The image display apparatus 100 can be used as an eyewear display including a diffraction grating type light guide plate for diffracting light in a constant direction, for example. In particular, the image display apparatus 100 can be applied to an optical system for augmented reality (AR).

As shown in FIG. 1, the image display apparatus 100 includes, for example, an image forming unit 101 having light sources for emitting light, a projection lens 102 that is an optical system, a light guide plate 103, an incident-side diffraction grating IN as a first diffraction grating, and an exit-side diffraction grating EX2 as a second diffraction grating. The incident-side diffraction grating IN and the exit-side diffraction grating EX2 are respectively provided in a light input surface 104 and a light output surface 105 that are surfaces of the light guide plate 103.

The image forming unit 101 is arranged facing one end of the light guide plate 103 and emits image light toward the incident-side diffraction grating IN on the light guide plate 103. It should be noted that the image forming unit 101 may emit image light from a plurality of pixels with a plurality of wavelengths.

The projection lens 102 is arranged between the image forming unit 101 and the light guide plate 103 and concentrates light emitted from the image forming unit 101. Moreover, the projection lens 102 is capable of converting image light with each image height emitted from the image forming unit 101 into parallel light for an angle of view. The projection lens 102 may be arranged tilted with respect to the light guide plate 103 or the image forming unit 101.

The light guide plate 103 is a parallel flat plate for guiding light so as not to change each light guide angle with respect to a light beam from each light source. Image light concentrated by the projection lens 102 enters the light guide plate 103. The entering image light travels inside the light guide plate 103 and is emitted outward from the light guide plate 103.

The light sources of the image forming unit 101 includes a display portion that makes a video or image and may be a self light emission type, may be liquid crystal on silicon (LCOS) or high temperature poly-silicon (HTPS) having an illumination system, or may be a digital light processing (DLP). In a case where the light sources are the self light emission type, the light sources may be light emitting diode (LED) light sources or laser diode (LD) light sources, which are integral with a panel and are extended.

The incident-side diffraction grating IN is a transmissive diffraction grating, for example. The incident-side diffraction grating IN is arranged at one end of a surface opposite to an incident surface side of the light guide plate 103 on which the image forming unit 101 is arranged. The incident-side diffraction grating IN is a diffraction grating for diffracting image light from the outside of the light guide plate 103 in a direction of a light guide angle. The incident-side diffraction grating IN diffracts and reflects image light entering the light guide plate 103 so that the image light travels inside the light guide plate 103.

The exit-side diffraction grating EX2 is a transmissive diffraction grating, for example. The exit-side diffraction grating EX2 is arranged at the other end of the same surface as the surface of the light guide plate 103 on which the incident-side diffraction grating IN is arranged. The exit-side diffraction grating EX2 is a diffraction grating for emitting the guided image light outward from the light guide plate 103. The exit-side diffraction grating EX2 diffracts and reflects the image light traveling inside the light guide plate 103 and emits the image light outward from the light guide plate 103. The exit-side diffraction grating EX2 has the same diffraction grating pitch as the incident-side diffraction grating IN and has a function of closing the grating vectors. Moreover, the exit-side diffraction grating EX2 may have a function of expanding a pupil. It should be noted that the incident-side diffraction grating IN and the exit-side diffraction grating EX2 may be transmissive diffraction gratings or may be volume gratings or surface-relief gratings. It should be noted that it is assumed that the surface-relief gratings are fabricated by imprinting in the examples described below, though the surface-relief gratings can be fabricated by injection molding, etching, casting, or the like.

Image light, which is diffracted and reflected by the exit-side diffraction grating EX2 from the side of the image forming unit 101 and emitted outward from the light guide plate 103, displays an image. Then, a user observes this image with eyes Eye.

The projection lens 102 converts, for example, a plurality of image light rays emitted from the image display apparatus 100 shown in FIG. 1 into parallel light rays for different angles of view. The incident-side diffraction grating IN on the light guide plate 103 further converts the parallel light rays to have an angle in a light guide direction. The exit-side diffraction grating EX2 makes the guided incident light rays with the different angles to have the angles before the incident light rays enter the light guide plate 103. The user can view an image when those light rays enter the pupils of the eyes Eye.

(2) Configuration Example of Diffraction Gratings

Figure 2:
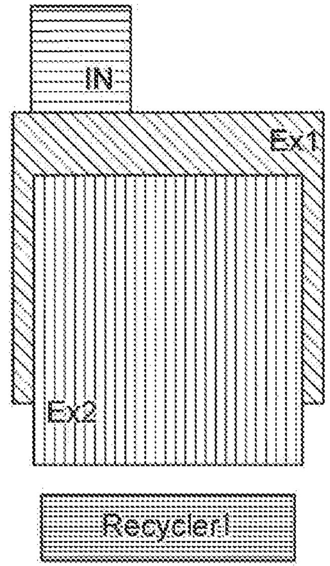
FIG. 2 A schematic diagram showing a configuration example of diffraction gratings provided in the image display apparatus according to the first embodiment of the present technology.
Figure 3:
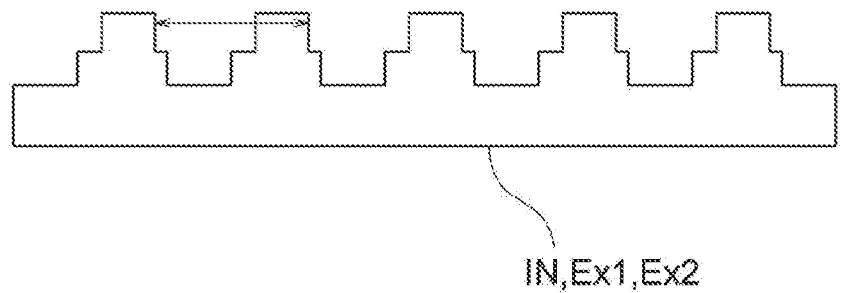
FIG. 3 A schematic diagram showing a pitch example of the diffraction gratings according to the first embodiment of the present technology.
Figure 4:
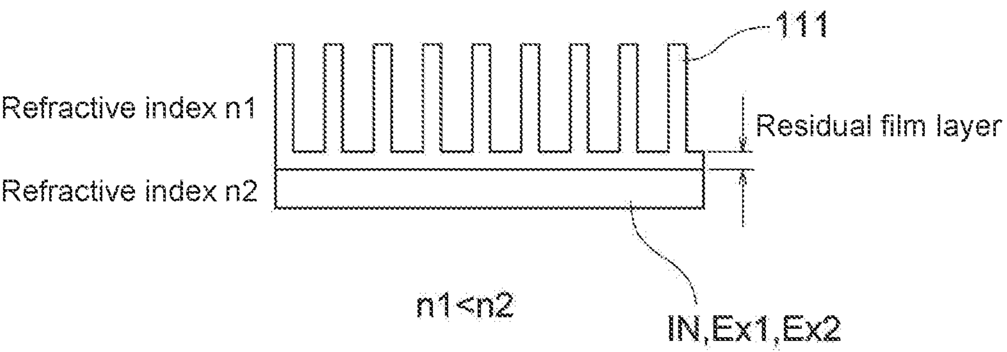
FIG. 4 A schematic diagram for describing surface refractive indices and a residual film thickness of the diffraction gratings according to the first embodiment of the present technology.

Next, a configuration example of double-sided diffraction gratings provided in the image display apparatus according to the present embodiment will be described with reference to FIGS. 2 to 4. FIG. 2 is a schematic diagram showing the configuration example of the diffraction gratings provided in the image display apparatus. FIG. 3 is a schematic diagram showing a pitch example of the diffraction gratings provided in the image display apparatus. FIG. 4 is a schematic diagram for describing surface refractive indices and a residual film thickness of the diffraction gratings provided in the image display apparatus in a case where they are fabricated by the imprinting technique.

As shown in FIG. 2, the image display apparatus 100 includes an incident-side diffraction grating IN, a pupil expansion diffraction grating EX1, an exit-side diffraction grating EX2, and a recycler diffraction grating Re 1. The pupil expansion diffraction grating EX1 and the exit-side diffraction grating EX2 are second diffraction gratings. The recycler diffraction grating Re 1 recycles a light beam not diffracted by the exit-side diffraction grating EX2 or travelling downward after the light beam is diffracted odd number of times on either one side. Diffraction gratings with narrow pitches, i.e., long diffraction vectors are arranged surrounding this IN, EX1, EX2.

The recycler diffraction grating Re 1 according to the present embodiment is arranged on the lower side of the exit-side diffraction grating EX2. However, recycler diffraction gratings Re 1 may be placed surrounding the incident-side diffraction grating IN, the pupil expansion diffraction grating EX1, and the exit-side diffraction grating EX2 and may be placed on both surfaces of their front surfaces and back surfaces. The recycler diffraction gratings Re 1 are thus diffraction gratings that are arranged surrounding the incident-side diffraction grating IN, the pupil expansion diffraction grating EX1, and the exit-side diffraction grating EX2 and have narrow pitches, i.e., long diffraction vectors.

At this time, the recycler diffraction grating Re 1 on the lower side functions to return a light beam upward, the recycler diffraction gratings Re 1 on the lateral sides function to return light laterally, and the recycler diffraction grating Re 1 on the upper side functions to return light downward. It should be noted that an angle at which the light returns varies depending on the grating design and also depending on the incident angle and the wavelength.

As shown in FIG. 3, for example, the pitch of each of the incident-side diffraction grating IN and the pupil expansion diffraction grating EX1 and the exit-side diffraction grating EX2 that are the second diffraction gratings is approximately 300 to 400 nm in a case where the refractive index of the light guide plate 103 is about 2 and the light sources emit light with a green wavelength of about 530 nm. The pitch of each of the recycler diffraction grating Re 1 is, for example, approximately 150 to 250 nm narrower than such a pitch. It should be noted that the pitch departs from such a range depending on the wavelength and the refractive index of the light guide plate because it is designed to have a suitable vector in accordance with the wavelength and the refractive index of the light guide plate.

As shown in FIG. 4, a surface-relief diffraction grating coated with metal such as aluminum in order to increase the diffraction efficiency is used as the incident-side diffraction grating IN. Moreover, since the IN vector of the incident-side diffraction grating IN is necessary as a function in only one direction, the incident-side diffraction grating IN desirably has a shape that increases the diffraction efficiency in the light guide direction by making its shape asymmetric. It should be noted that an echelle type surface-relief diffraction grating may be used as the incident-side diffraction grating IN.

The EX1 vector and the EX2 vector of the pupil expansion diffraction grating EX1 and the exit-side diffraction grating EX2 desirably have diffraction efficiency in both directions in which the pupil expansion diffraction grating EX1 and the exit-side diffraction grating EX2 return the light. The pupil expansion diffraction grating EX1 and the exit-side diffraction grating EX2 are desirably a binary type, a nearly symmetric echelle type, a trapezoid type, and blazed type. It should be noted that the pupil expansion diffraction grating EX1 and the exit-side diffraction grating EX2 each desirably have an asymmetric shape in some cases, e.g., in a case of providing the diffraction efficiency with respect to the incident angle with an asymmetric property. Each of the pupil expansion diffraction grating EX1 and the exit-side diffraction grating EX2 desirably has a residual film thickness of 50 nm or less in a case where its refractive index is lower than the refractive index of the light guide plate 103. It should be noted that the residual film thickness may be 50 nm or more as long as the diffraction grating refractive index is substantially equal to or slightly lower than that of the light guide plate 103.

Although aluminum coating is desirable for the recycler diffraction grating Re 1, a coating with a highly refractive film such as a titanium dioxide ($TiO_2$) may be employed. An echelle type, blazed type, trapezoid type, or slanted type surface-relief diffraction grating, a diffraction grating with a sub-pitch, or a binary metasurface in any optimized shape can be used. Also as to the recycler diffraction grating Re 1, the Re 1 vector only needs to function in one direction that is a direction to return light. It is desirable that a diffraction grating with an asymmetric property improve the diffraction efficiency in the direction to return light. It should be noted that regarding a spacing between the respective diffraction grating areas, they are spaced apart from each other by approximately 0.2 mm to 3 mm in view of the manufacturing tolerance.

(3) Example of Image Display Method

Figure 5A:
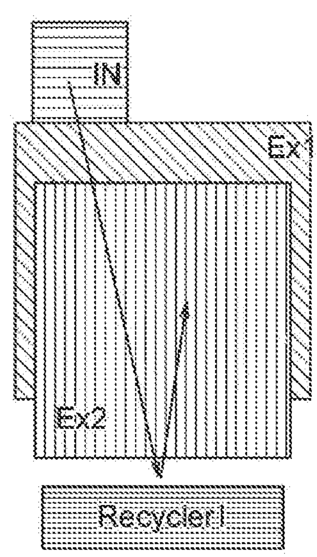
FIGS. 5A and 5B Are schematic diagrams showing light propagation with the diffraction gratings according to the first embodiment of the present technology.
Figure 5B:
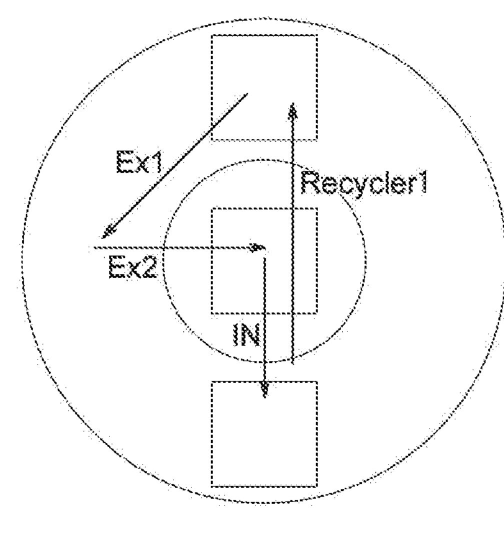

Next, an example of an image display method using the image display apparatus 100 according to the present embodiment will be described with reference to FIG. 5. FIG. 5A is a schematic diagram showing light propagation with the diffraction gratings provided in the image display apparatus. FIG. 5B is a conceptual diagram expressing light propagation with the diffraction gratings provided in the image display apparatus in a K-space.

The image display method using the image display apparatus 100 includes a step of emitting image light from the image forming unit 101; a step of causing the emitted image light to enter the light guide plate 103; a step of diffracting the image light entering the light guide plate 103 and causing the image light to travel inside the light guide plate 103; a step of diffracting the image light traveling inside the light guide plate 103 and emitting the image light outward from the light guide plate 103; and a step of recycling the image light travelling inside the light guide plate 103 and emitting the image light outward from the light guide plate.

A basic configuration of the diffraction gratings provided in the image display apparatus is a configuration with three closed diffraction grating vectors of the incident-side diffraction grating IN and the pupil expansion diffraction grating EX1 and the exit-side diffraction grating EX2 that are the second diffraction gratings.

The pupil expansion diffraction grating EX1 and the exit-side diffraction grating EX2 are arranged on different opposed surfaces of the light guide plate 103, respectively. Either one of the diffraction gratings may be arranged on the front surface. Moreover, the areas do not need to have the same size and shape, and for example, the areas are formed in a rectangular shape. In addition, the areas may be entirely or partially overlap each other. Any design can be made in consideration of ray paths.

With such a basic configuration, a group of parallel light beams emitted from the image forming unit 101 such as an optical engine like a projector in the image display apparatus 100 first hits the incident-side diffraction grating IN(=IN coupler) on the light guide plate 103. The group of parallel light beams is thus diffracted in an angle direction satisfying a total internal reflection angle of the light guide plate 103.

The diffracted light beams are guided while being repeatedly reflected inside the light guide plate 103. By hitting the pupil expansion diffraction grating EX1 (=expander diffraction grating) multiple times, the light beams are expanded in the surface as viewed from the upper surface of the light guide surfaces.

The expanded light beams are diffracted outward from the light guide plate 103 every time the expanded light beams hit the exit-side diffraction grating EX2 (=EX2 coupler). The expanded light beams gradually return to the original light beam angles in this manner. Then, the light beams are output.

The user's eyes Eye are located at positions apart from the light guide plate 103 by approximately 10 to 30 mm. The user can see an image when these light beams output from the light guide plate 103 enter the pupils of the eyes Eye.

It should be noted that the light beams do not necessarily need to be diffracted in the above-mentioned order. Light entering the incident-side diffraction grating IN may first hit the EX2 coupler and the EX2 coupler may expand the light. That is, the pupil expansion diffraction grating EX1 may serve as the exit-side diffraction grating EX2.

In addition, in the image display apparatus 100, the vectors are always closed by either one of the recycler diffraction grating Re 1, the incident-side diffraction grating IN, the pupil expansion diffraction grating EX1, and the exit-side diffraction grating EX2 or a combination thereof. It should be noted that regarding the grating vector set forth in the description, it refers to only length and angle and it does not refer to direction nor orientation.

As shown in FIGS. 5A and 5B, in the image display apparatus 100, for example, four vectors of the recycler diffraction grating Re 1 arranged on the lower side, the incident-side diffraction grating IN, the pupil expansion diffraction grating EX1, and the exit-side diffraction grating EX2 are closed. The present embodiment is an example in which the recycler diffraction grating Re 1 recycles light not diffracted by the pupil expansion diffraction grating EX1.

Accordingly, light beams entering the incident-side diffraction grating IN pass through the pupil expansion diffraction grating EX1 and the exit-side diffraction grating EX2, hit the recycler diffraction grating Re 1, and return. The returning light beams further hit the pupil expansion diffraction grating EX1 and/or the exit-side diffraction grating EX2 and exit the light guide plate 103. In this manner, the light beams are guided while changing the angle in accordance with the vectors, come and go at light guide angles multiple times, finally return to the original angle when they are made incident, and exit the light guide plate 103.

Here, a conventional single-axis pupil expansion light guide plate has a problem in that the IN size and the lens size increase with respect to the light guide direction. In view of this, a two-axis pupil expansion technique of reducing the IN size by performing pupil expansion in two axis directions has been proposed. However, the two-axis pupil expansion technique has a problem in that the use of a one-dimensional diffraction grating increases the size of the light guide plate in view of layout arrangement.

In view of this, a technique of arranging symmetric one-dimensional diffraction gratings on both surfaces has been devised. Moreover, although a two-dimensional diffraction grating is also arranged, there is a problem in that a large amount of light is lost in the light guide direction. It is because although the pupil is expanded while light is partially diffracted during light guide, some light is not diffracted to the end, so the light is lost in two-axis travelling directions. It has been found that it significantly lowers the efficiency.

In contrast, the image display apparatus 100 according to the present embodiment can reduce the loss of light beams in the propagation direction because the image display apparatus 100 according to the present embodiment includes the recycler diffraction grating (Re 1) and the four vectors of the recycler diffraction grating (Re 1), the incident-side diffraction grating IN, the pupil expansion diffraction grating EX1, and the exit-side diffraction grating EX2 are closed. Accordingly, the image display apparatus 100 can achieve uniform image quality while improving the use efficiency of incident light and can also reduce the power consumption. In addition, the image display apparatus 100 can also achieve downsizing since it uses the double-sided diffraction gratings.

(4) Modified Example of Diffraction Gratings

Figure 6A:
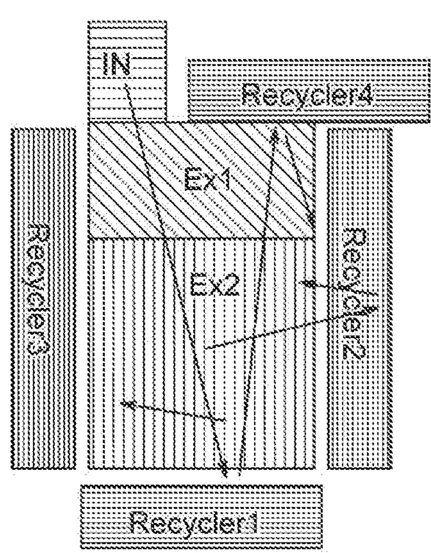
FIGS. 6A and 6B Are schematic diagrams showing light propagation according to a modified example of the diffraction grating according to the first embodiment of the present technology.
Figure 6B:
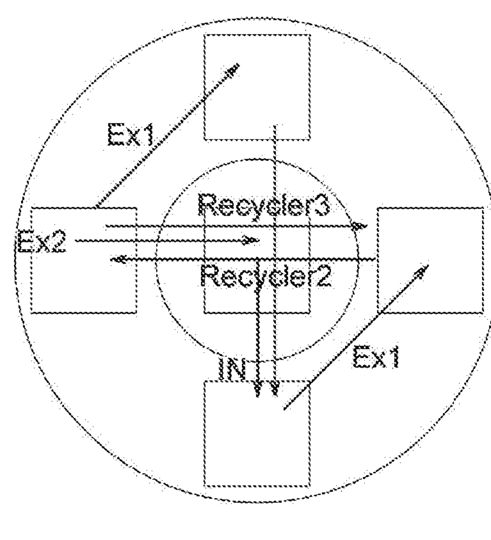

Next, diffraction gratings according to a modified example of the present embodiment will be described with reference to FIG. 6. FIG. 6A is a schematic diagram showing light propagation with the diffraction gratings according to the modified example of the present embodiment. FIG. 6B is a conceptual diagram expressing light propagation with the diffraction gratings according to the modified example of the present embodiment in a K-space.

As shown in FIGS. 6A and 6B, the diffraction gratings according to the modified example of the present embodiment includes a recycler diffraction grating Re 1 arranged on the lower side and further includes a recycler diffraction grating Re 2 on the right side surfaces of the pupil expansion diffraction grating EX1 and the exit-side diffraction grating EX2, a recycler diffraction grating Re 3 on the left side surfaces of the pupil expansion diffraction grating EX1 and the exit-side diffraction grating EX2, and a recycler diffraction grating Re 4 in the periphery of the incident-side diffraction grating IN on the upper side. In this modified example, the vectors are closed by a combination of these recycler diffraction gratings, the incident-side diffraction grating IN, the pupil expansion diffraction grating EX1, and the exit-side diffraction grating EX2. This modified example is an example in which the recycler diffraction gratings Re 1 to Re 4 recycle undiffracted light.

In this modified example, for example, light beams entering the incident-side diffraction grating IN pass through the pupil expansion diffraction grating EX1 and the exit-side diffraction grating EX2, hit the recycler diffraction grating Re 1, and return. The returning light beams pass through the pupil expansion diffraction grating EX1 and/or the exit-side diffraction grating EX2, hit any one of the recycler diffraction gratings Re 2 to Re 4, and return. The returning light beams further hit the pupil expansion diffraction grating EX1 and/or the exit-side diffraction grating (EX2) and exit the light guide plate 103.

The image display apparatus 100 using the diffraction gratings according to this modified example can achieve uniform image quality while further improving the use efficiency of incident light in addition to effects similar to those of the image display apparatus 100 according to the present embodiment because the image display apparatus 100 using the diffraction gratings according to this modified example includes the recycler diffraction gratings Re 2 to Re 4 in addition to the recycler diffraction grating Re 1.

2. Second Embodiment (1) Configuration Example of Diffraction Gratings

Figure 7A:
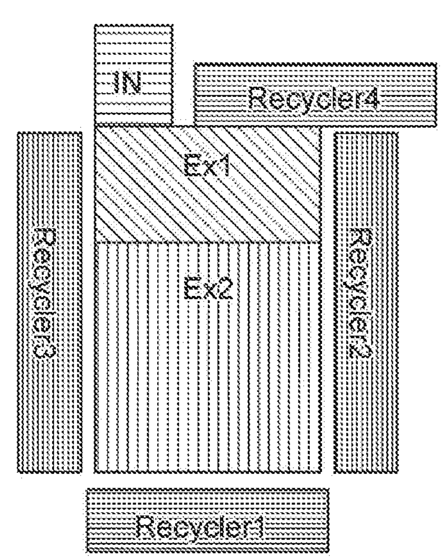
FIGS. 7A and 7B Are schematic diagrams showing light propagation with diffraction gratings according to a second embodiment of the present technology.
Figure 7B:
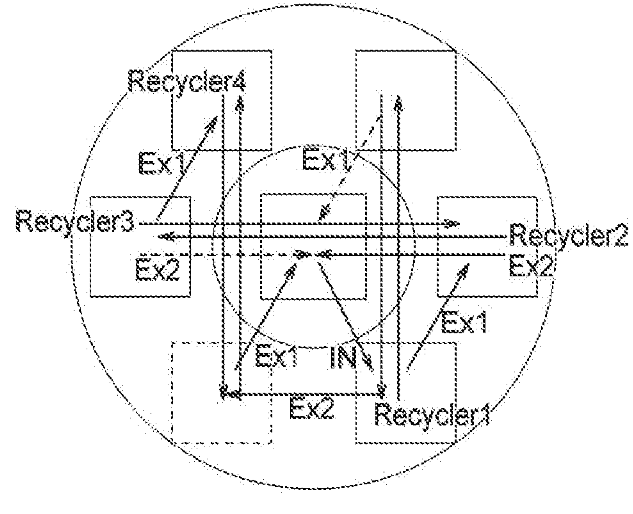

Next, a configuration example of diffraction gratings of an image display apparatus according to a second embodiment of the present technology will be described with reference to FIG. 7. FIG. 7A is a schematic diagram showing the configuration example of the diffraction gratings according to the present embodiment. FIG. 7B is a conceptual diagram expressing light propagation with the diffraction gratings according to the present embodiment in a K-space. The image display apparatus according to the present embodiment has a different arrangement direction of the incident-side diffraction grating IN, the pupil expansion diffraction grating EX1, and the exit-side diffraction grating EX2.

As shown in FIG. 7A, the image display apparatus according to the present embodiment includes a recycler diffraction grating Re 1 on the lower side of the pupil expansion diffraction grating EX1 and the exit-side diffraction grating EX2, which is an opposite side of the incident-side diffraction grating IN, a recycler diffraction grating Re 2 on the right side surfaces of the pupil expansion diffraction grating EX1 and the exit-side diffraction grating EX2, a recycler diffraction grating Re 3 on the left side surfaces of the pupil expansion diffraction grating EX1 and the exit-side diffraction grating EX2, and the recycler diffraction grating Re 4 in the vicinity of the side surface of the incident-side diffraction grating IN on the upper side.

The Re 2 and Re 3 vectors of the recycler diffraction gratings Re 2 and Re 3 on the both sides surfaces are set to be parallel to each other and directed in opposite to each other. The recycler diffraction grating Re 1 is arranged perpendicularly in a symmetric direction with respect to the horizontal axis in the K-space. The recycler diffraction grating Re 4 has a vector parallel to the recycler diffraction grating Re 1 and having the same length as the recycler diffraction grating Re 1.

As shown in FIG. 7B, for example, a vector route via the recycler diffraction grating Re 2 can be various routes, e.g., IN→EX1→Recycler 2→EX2 or IN→EX1→Recycler 2→EX1→Recycler 4→EX1. These vectors via the recycler diffraction grating Re 2 only need to be closed. Passing through the various routes makes the light beam directions to expand upwards, downwards, leftwards, and rightwards so as to achieve pupil expansion. In addition, in the double-sided design, it can serve to send the light beams to necessary positions inside the light guide plate surface in consideration of the user's pupil positions.

In accordance with the image display apparatus including the diffraction gratings according to the present embodiment, the uniform image quality can be achieved while improving the use efficiency of incident light as in the image display apparatus 100 according to the first embodiment.

(2) Modified Examples of Diffraction Gratings

Next, Modified Examples 1 to 7 of the diffraction gratings according to the present embodiment will be described with reference to FIGS. 8 to 14. FIG. 8A to FIG. 14A are schematic diagrams showing configuration examples of diffraction gratings according to Modified Examples 1 to 7 of the present embodiment. FIG. 8B to FIG. 14B are conceptual diagrams expressing light propagation with the diffraction gratings according to Modified Examples 1 to 7 of the present embodiment in a K-space.

Figure 8A:
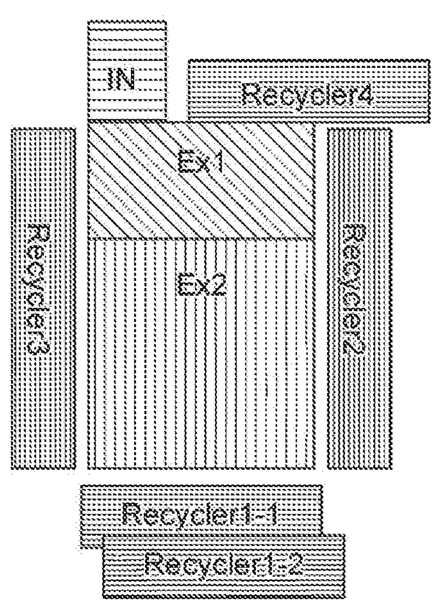
FIGS. 8A and 8B Are schematic diagrams showing light propagation according to a modified example of the diffraction grating according to the second embodiment of the present technology.
Figure 8B:
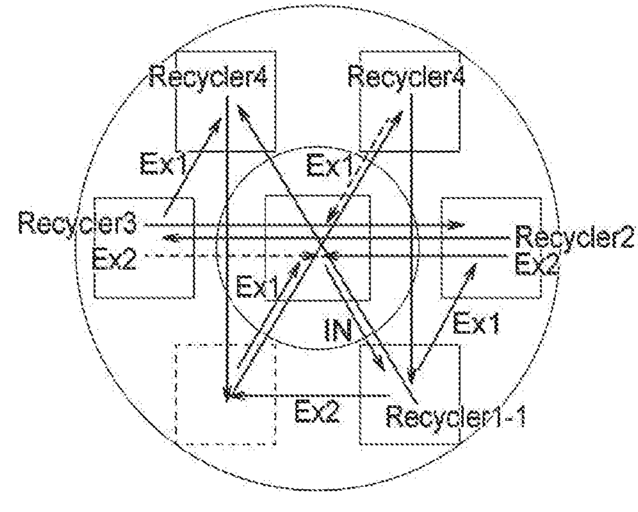

The diffraction gratings according to Modified Example 1 shown in FIGS. 8A and 8B include recycler diffraction gratings Re 2 to Re 4 similar to those of the present embodiment but they include recycler diffraction gratings Re 1-1 and 1-2 placed on the lower side at different angles to be symmetric in the vertical axis. The recycler diffraction gratings Re 1-1 and 1-2 are, for example, arranged facing each other on the front and back surfaces.

Figures 9A, 9B:
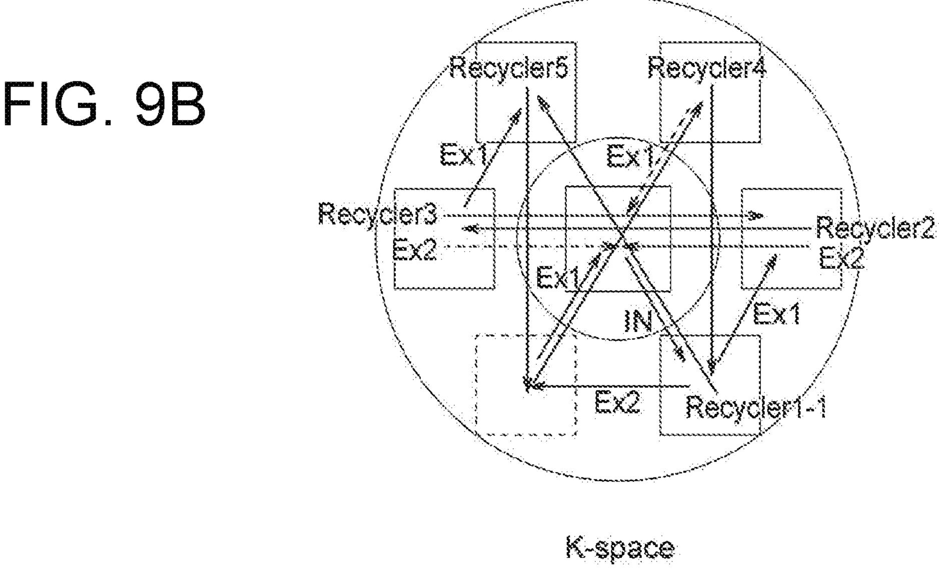
FIGS. 9A and 9B Are schematic diagrams showing light propagation according to a modified example of the diffraction grating according to the second embodiment of the present technology.

In the diffraction gratings according to Modified Example 2 shown in FIGS. 9A and 9B, the recycler diffraction gratings Re 2 and Re 3 on the both sides are similar to those of the present embodiment and the recycler diffraction gratings Re 1-1 and 1-2 on the lower side are similar to those of Modified Example 1 of the present embodiment. Modified Example 2 includes recycler diffraction gratings Re 4 and Re 5 in the vicinity of the both side surfaces of the incident-side diffraction grating IN on the upper side. Modified Example 2 is an example in which the diffraction gratings can be placed in consideration of where the optical engine is wished to be placed.

Figures 10A, 10B:
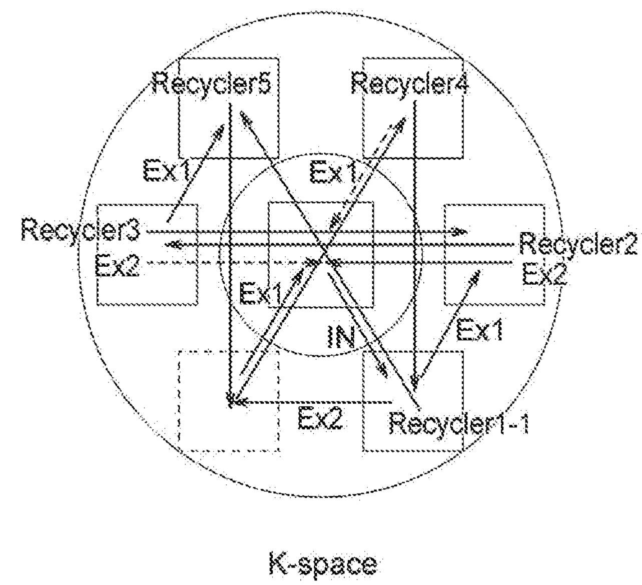
FIGS. 10A and 10B Are schematic diagrams showing light propagation according to a modified example of the diffraction grating according to the second embodiment of the present technology.

The diffraction gratings according to Modified Example 3 shown in FIGS. 10A and 10B include recycler diffraction gratings Re 1-1 and 1-2, a recycler diffraction grating Re 2, a recycler diffraction grating Re 3, a recycler diffraction grating Re 4, and a recycler diffraction grating Re 5 as in Modified Example 2 of the present embodiment. In addition, Modified Example 3 includes a recycler diffraction grating Re 6 outside the incident-side diffraction grating IN. Modified Example 3 enables return and recycle of light beams exiting the incident-side diffraction grating IN via those recycler diffraction gratings and light beams exiting the incident-side diffraction grating IN only via the pupil expansion diffraction grating EX1 and the exit-side diffraction grating EX2. The recycler diffraction grating Re 6 is placed on the opposite side of the incident-side diffraction grating IN in the light guide direction. This enables light beams traveling backwards by diffraction with an opposite order from the incident-side diffraction grating IN to return in a necessary light guide direction. Moreover, the recycler diffraction grating Re 6 on the upper side of the incident-side diffraction grating IN can return not only light entering the incident-side diffraction grating IN but also light fed back from the other diffraction gratings such as the pupil expansion diffraction grating EX1 and the exit-side diffraction grating EX2. Thus, the use efficiency can be increased.

Figure 11A:
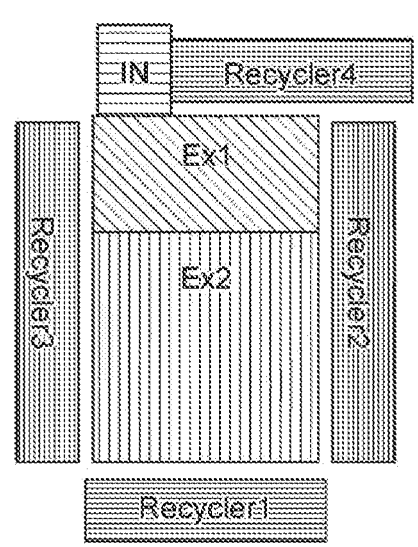
FIGS. 11A and 11B Are schematic diagrams showing light propagation according to a modified example of the diffraction grating according to the second embodiment of the present technology.
Figure 11B:
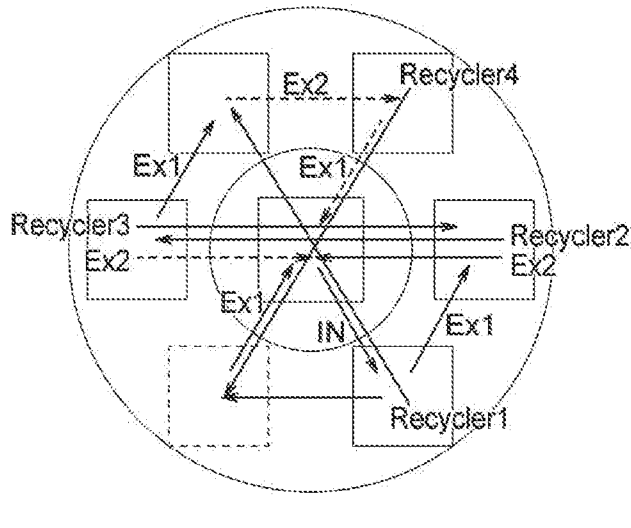

The diffraction gratings according to Modified Example 4 shown in FIGS. 11A and 11B are in the same arrangement as the diffraction gratings according to this example. The diffraction gratings according to Modified Example 4 are arranged so that the recycler diffraction gratings Re 1-1 and 1-2 on the lower side can return light beams obliquely in one direction and the recycler diffraction grating Re 4 on the upper side can return light beams obliquely in one direction, which is opposite to the one direction in which the recycler diffraction gratings Re 1-1 and 1-2 on the lower side return light beams.

Figure 12A:
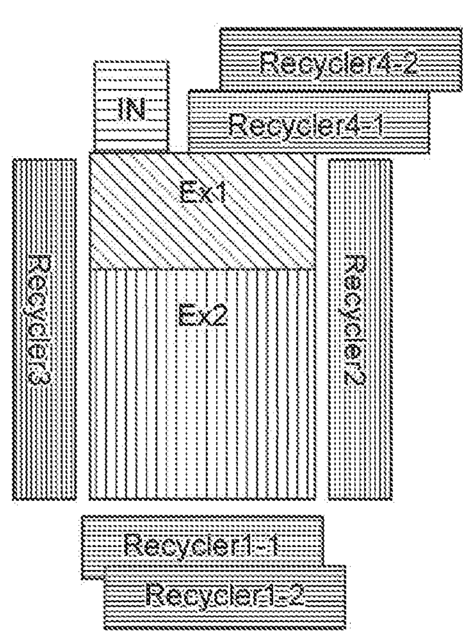
FIGS. 12A and 12B Are schematic diagrams showing light propagation according to a modified example of the diffraction grating according to the second embodiment of the present technology.
Figure 12B:
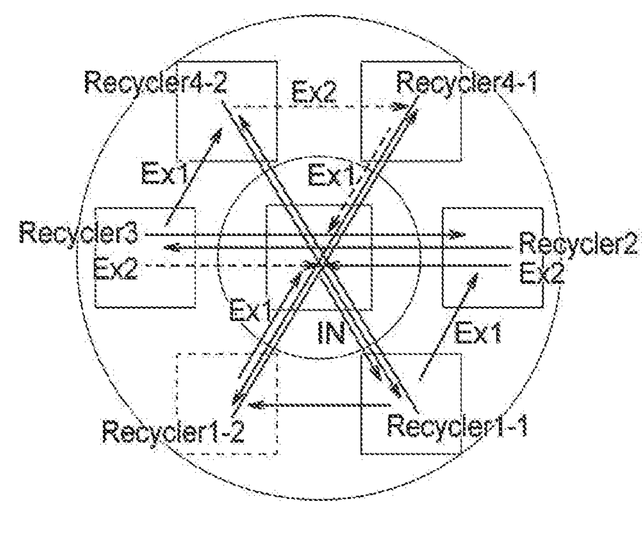

In the diffraction gratings according to Modified Example 5 shown in FIGS. 12A and 12B, the recycler diffraction gratings Re 2 and Re 3 on the both sides and the recycler diffraction gratings Re 1-1 and 1-2 on the lower side are similar to those of Modified Example 1 of the present embodiment. In addition, Modified Example 5 includes recycler diffraction gratings Re 4-1 and Re 4-2 in the vicinity of the side surface of the incident-side diffraction grating IN on the upper side.

Figure 13A:
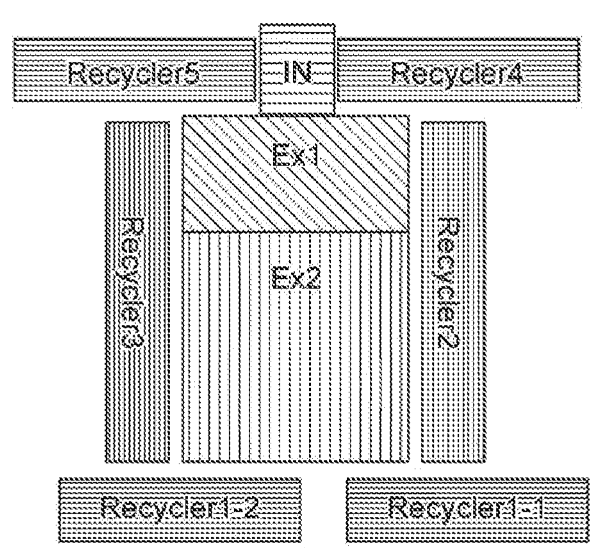
FIGS. 13A and 13B Are schematic diagrams showing light propagation according to a modified example of the diffraction grating according to the second embodiment of the present technology.
Figure 13B:
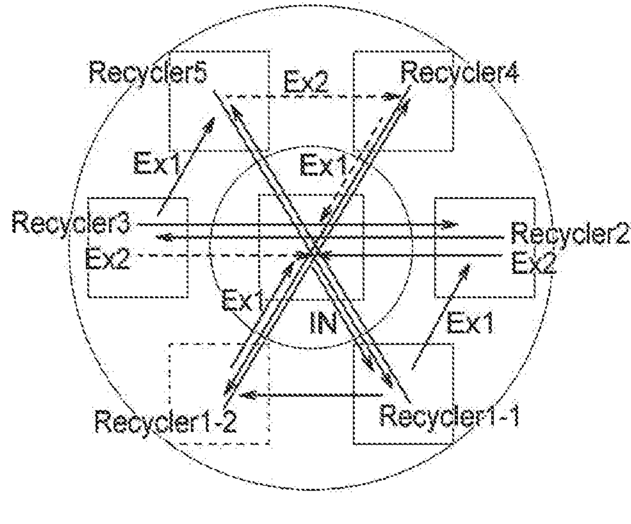

In the diffraction gratings according to Modified Example 6 shown in FIGS. 13A and 13B, the recycler diffraction gratings Re 2 and Re 3 on the both sides are similar to those of the present embodiment. In addition, in Modified Example 6, recycler diffraction gratings Re 1-1 and Re 1-2 are arranged side by side on the lower side and recycler diffraction gratings Re 4-1 and Re 4-2 are provided in the vicinity of the both side surfaces of the incident-side diffraction grating IN on the upper side.

Figures 14A, 14B:
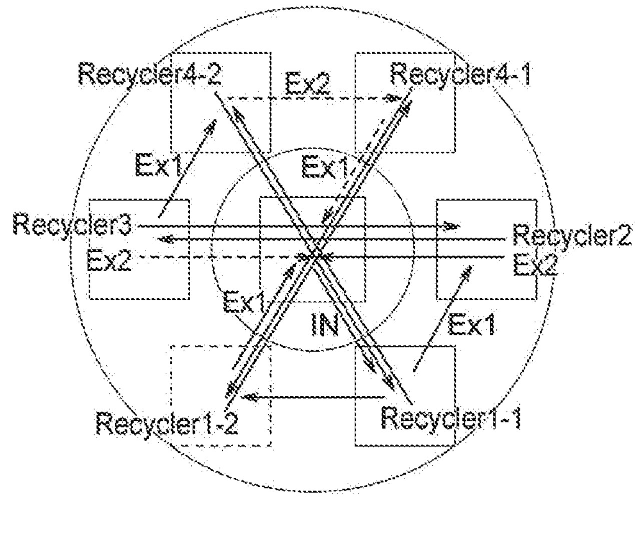
FIGS. 14A and 14B Are schematic diagrams showing light propagation according to a modified example of the diffraction grating according to the second embodiment of the present technology.

In the diffraction gratings according to Modified Example 7 shown in FIGS. 14A and 14B, the recycler diffraction gratings Re 2 and Re 3 on the both sides and the recycler diffraction gratings Re 1-1 and 1-2 on the lower side are similar to those of Modified Example 1 of the present embodiment. In addition, in Modified Example 7, recycler diffraction gratings Re 4-1 and Re 4-2 and recycler diffraction gratings Re 5-1 and Re 5-2 are provided in the vicinity of the both side surfaces of the incident-side diffraction grating IN on the upper side.

Modified Examples 5 to 7 of the present embodiment are examples to return light beams symmetrically in two directions along the horizontal axis on both the lower and upper sides. As in Modified Example 5 and Modified Example 7, it is also possible to arrange the recycler diffraction gratings on the both surfaces and return light beams efficiently. Although the recycler diffraction gratings are arranged side by side or arranged on the both surfaces as in Modified Example 6, it is also possible to arrange the recycler diffraction gratings on partial areas, not the entire surfaces, or to arrange the recycler diffraction gratings in a combination thereof. It should be noted that the design can be performed in consideration of light beam layout, uniformity, and efficiency.

3. Third Embodiment (1) Configuration Example of Diffraction Gratings

Next, a configuration example of diffraction gratings of an image display apparatus according to a third embodiment of the present technology will be described with reference to FIG. 15. FIG. 15A is a schematic diagram showing the configuration example of the diffraction gratings according to the present embodiment. FIG. 15B is a conceptual diagram expressing light propagation with the diffraction gratings according to the present embodiment in a K-space. The image display apparatus according to the present embodiment has a different arrangement direction of the incident-side diffraction grating IN, the pupil expansion diffraction grating EX1, and the exit-side diffraction grating EX2 from the arrangement direction of the second embodiment.

Figures 15A, 15B:
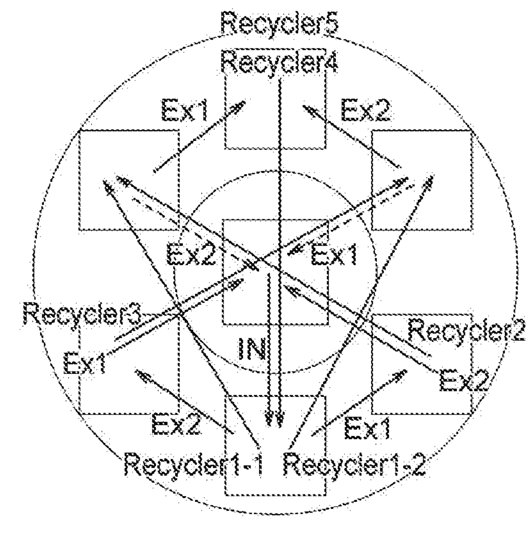
FIGS. 15A and 15B Are schematic diagrams showing light propagation with diffraction gratings according to a third embodiment of the present technology.

As shown in FIGS. 15A and 15B, the image display apparatus according to the present embodiment includes recycler diffraction gratings Re 1-1 and 1-2 on the lower side of the pupil expansion diffraction grating EX1 and the exit-side diffraction grating EX2, which is an opposite side of the incident-side diffraction grating IN, a recycler diffraction grating Re 2 on the right side surfaces of the pupil expansion diffraction grating EX1 and the exit-side diffraction grating EX2, a recycler diffraction grating Re 3 on the left side surfaces of the pupil expansion diffraction grating EX1 and the exit-side diffraction grating EX2, and recycler diffraction gratings Re 4 and Re 5 in the vicinity of the both side surfaces of the incident-side diffraction grating IN on the upper side.

As shown in FIG. 15A, since the pupil expansion diffraction grating EX1 and the exit-side diffraction grating EX2 are symmetric, the incident-side diffraction grating IN is placed substantially at the middle in the left- and right-hand directions. It should be noted that since the presence of the recycler diffraction gratings makes light beams return, the incident-side diffraction grating IN does not necessarily need to be arranged at the middle. The incident-side diffraction grating IN may be shifted in the left- and right-hand directions and the upper and lower directions depending on where the optical engine is wished to be placed.

The recycler diffraction gratings Re 2 and Re 3 on the both sides surfaces according to the present embodiment have obliquely upward vectors. Moreover, the recycler diffraction gratings Re 1-1 and 1-2 on the lower side have upward vectors in two directions. The recycler diffraction gratings Re 4 and Re 5 on the upper side have vertically downward vectors in one direction.

In accordance with the image display apparatus including the diffraction gratings according to the present embodiment, the plurality of recycler diffraction gratings is provided and the vectors closed by a combination of these recycler diffraction gratings and the diffraction gratings as the basic configuration are formed. The uniform image quality can be thus achieved while improving the use efficiency of incident light as in the image display apparatus 100 according to the first embodiment.

(2) Modified Examples of Diffraction Gratings

Next, diffraction gratings according to Modified Examples 1 to 6 of the present embodiment will be described with reference to FIGS. 16 to 21. FIG. 16A to FIG. 21A are schematic diagrams showing configuration examples of diffraction gratings according to Modified Examples 1 to 6 of the present embodiment. FIG. 16B to FIG. 21B are conceptual diagrams expressing light propagation with the diffraction gratings according to Modified Examples 1 to 6 of the present embodiment in a K-space.

Figures 16A, 16B:
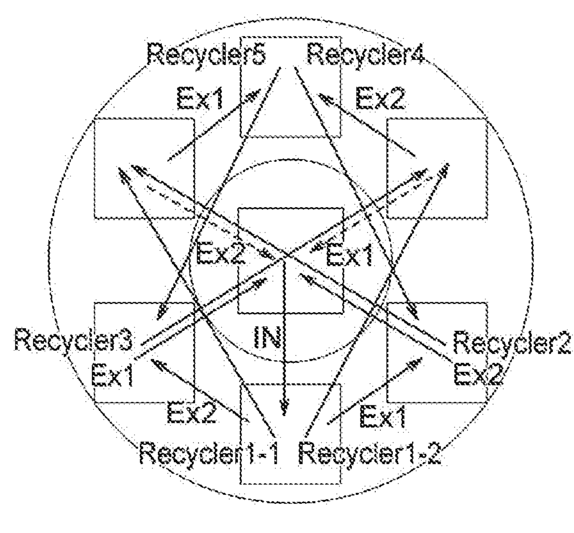
FIGS. 16A and 16B Are schematic diagrams showing light propagation according to a modified example of the diffraction grating according to the third embodiment of the present technology.

The diffraction gratings according to Modified Example 1 shown in FIGS. 16A and 16B include recycler diffraction gratings Re 1-1 and 1-2 and recycler diffraction gratings Re 2 to Re 5 similar to the diffraction gratings according to the present embodiment. In Modified Example 1 of the present embodiment, the recycler diffraction gratings Re 1-1 and 1-2 on the lower side have upward vectors in two directions and the recycler diffraction gratings Re 4 and Re 5 on the upper side have downward vectors in two directions.

Figure 17A:
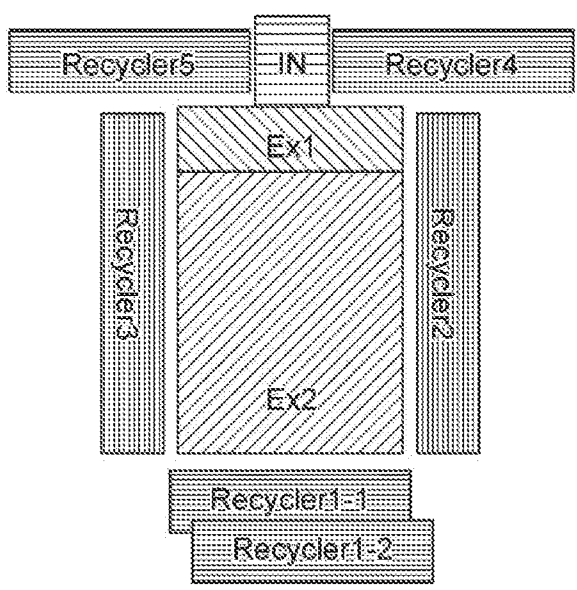
FIGS. 17A and 17B Are schematic diagrams showing light propagation according to a modified example of the diffraction grating according to the third embodiment of the present technology.
Figure 17B:
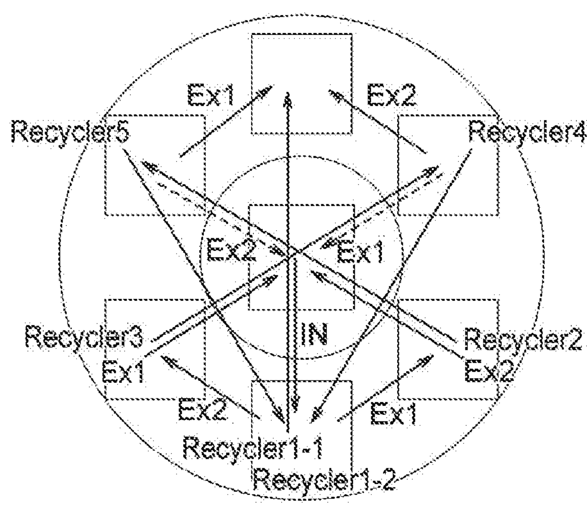

The diffraction gratings according to Modified Example 2 shown in FIGS. 17A and 17B also include the recycler diffraction gratings Re 1-1 and 1-2 and the recycler diffraction gratings Re 2 to Re 5 similar to the diffraction gratings according to the present embodiment. In Modified Example 2 of the present embodiment, the recycler diffraction gratings Re 1-1 and 1-2 on the lower side have upward vectors in one direction and the recycler diffraction gratings Re 4 and Re 5 on the upper side have downward vectors in two directions.

Figures 18A, 18B:
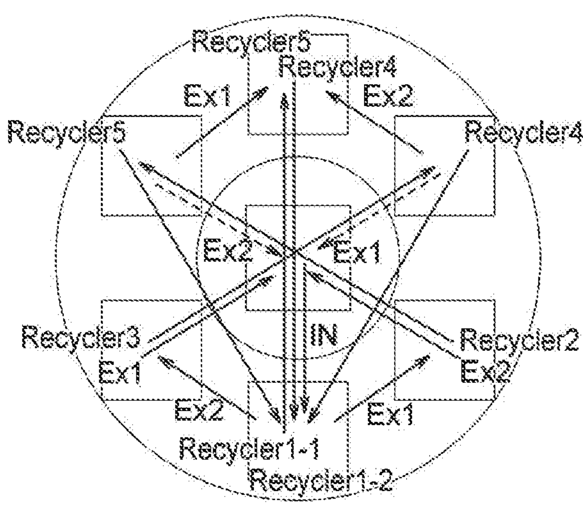
FIGS. 18A and 18B Are schematic diagrams showing light propagation according to a modified example of the diffraction grating according to the third embodiment of the present technology.

The diffraction gratings according to Modified Example 3 shown in FIGS. 18A and 18B also include recycler diffraction gratings Re 1-1 and 1-2 and recycler diffraction gratings Re 2 to Re 5 similar to the diffraction gratings according to the present embodiment. In Modified Example 3 of the present embodiment, the recycler diffraction gratings Re 1-1 and 1-2 on the lower side and the recycler diffraction gratings Re 4 and Re 5 on the upper side have vectors parallel to each other and directed in opposite to each other with the same length.

Figures 19A, 19B:
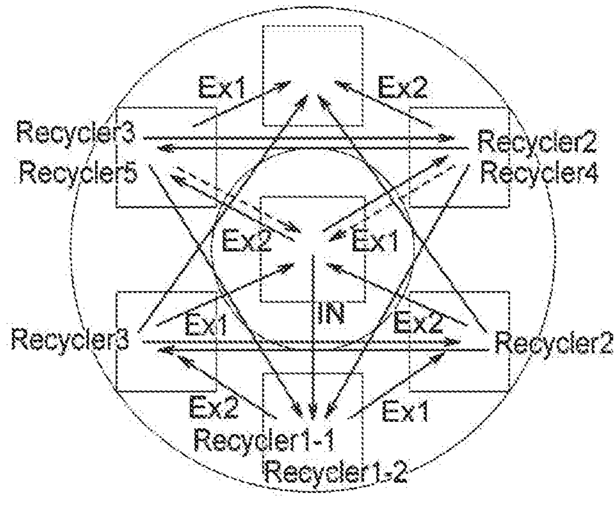
FIGS. 19A and 19B Are schematic diagrams showing light propagation according to a modified example of the diffraction grating according to the third embodiment of the present technology.

The diffraction gratings according to Modified Example 4 shown in FIGS. 19A and 19B also include recycler diffraction gratings Re 1-1 and 1-2 and recycler diffraction gratings Re 2 to Re 5 similar to the diffraction gratings according to the present embodiment. In Modified Example 4 of the present embodiment, the recycler diffraction gratings Re 2 and Re 3 on the both sides surfaces have vectors in a direction parallel to the horizontal axis. Moreover, in Modified Example 4 of the present embodiment, the recycler diffraction gratings Re 1-1 and 1-2 on the lower side and the recycler diffraction gratings Re 4 and Re 5 on the upper side both have vectors in two directions. Here, the second-order light from the exit-side diffraction grating EX2 is used for moving light beams from the lower right area to the upper left area shown in FIG. 19B.

Figures 20A, 20B:
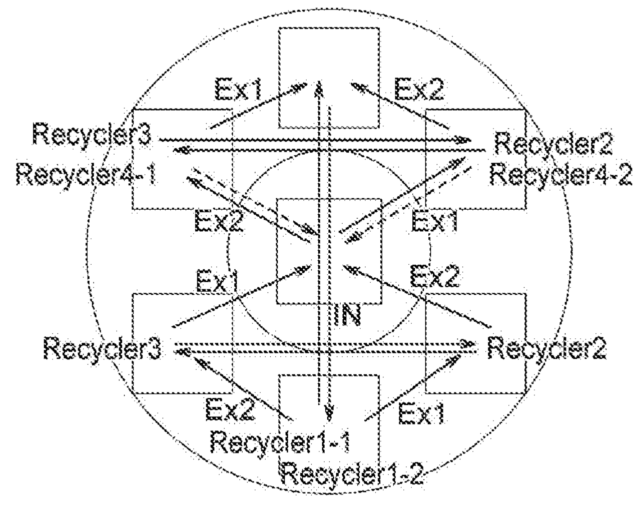
FIGS. 20A and 20B Are schematic diagrams showing light propagation according to a modified example of the diffraction grating according to the third embodiment of the present technology.

The diffraction gratings according to Modified Example 5 shown in FIGS. 20A and 20B include recycler diffraction gratings Re 1-1 and 1-2 similar to the diffraction gratings according to the present embodiment. Moreover, the diffraction gratings according to Modified Example 5 of the present embodiment include recycler diffraction gratings Re 2-1 and Re 2-2 on the right side surfaces of the pupil expansion diffraction grating EX1 and the exit-side diffraction grating EX2 and recycler diffraction gratings Re 3-1 and Re 3-2 on the left side surfaces of the pupil expansion diffraction grating EX1 and the exit-side diffraction grating EX2. In addition, the diffraction gratings according to Modified Example 5 of the present embodiment include recycler diffraction gratings Re 4-1 and Re 4-2 and recycler diffraction gratings Re 5-1 and Re 5-2 in the vicinity of the both side surfaces of the incident-side diffraction grating IN on the upper side, respectively.

In Modified Example 5 of the present embodiment, the recycler diffraction gratings Re 1-1 and 1-2 on the lower side and the recycler diffraction gratings Re 4-1, Re 4-2, Re 5-1, and Re 5-2 on the upper side have parallel vectors with the same length. In Modified Example 5 of the present embodiment, a single type of vectors are set while the recycler diffraction gratings are arranged both on the front and back surfaces in order to increase the efficiency for returning light beams. It should be noted that the recycler diffraction gratings may be arranged only on one of the surfaces or some of the recycler diffraction gratings may be arranged on both surfaces in consideration of the manufacturability.

Figure 21A:
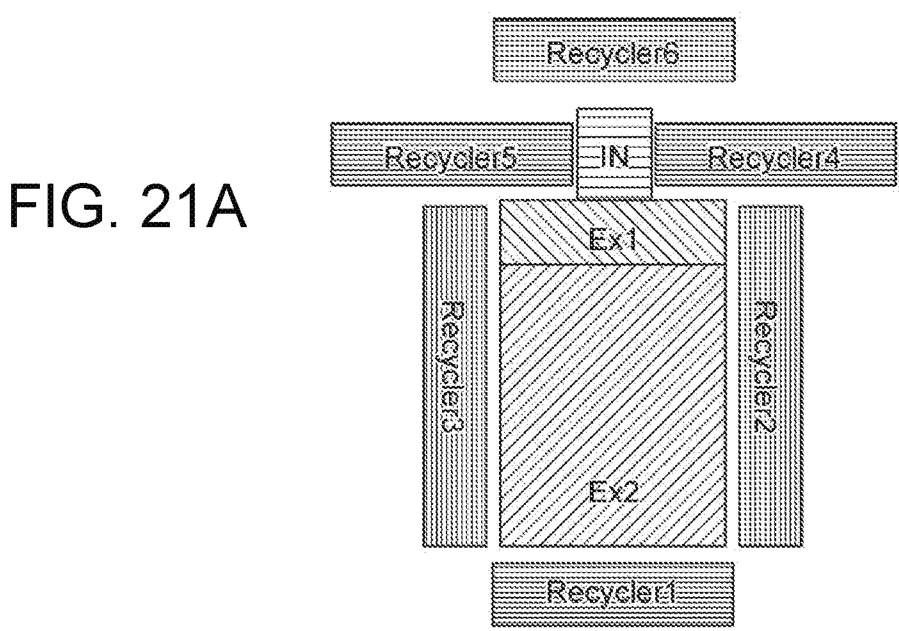
FIGS. 21A and 21B Are schematic diagrams showing light propagation according to a modified example of the diffraction grating according to the third embodiment of the present technology.
Figure 21B:
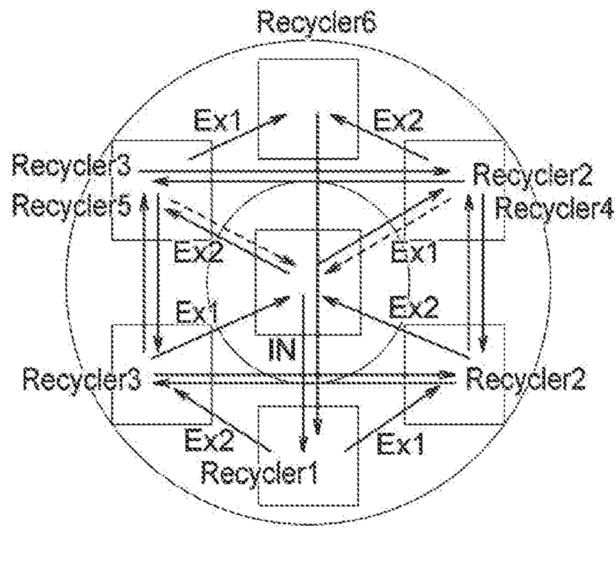

The diffraction gratings according to Modified Example 6 shown in FIGS. 21A and 21B include a recycler diffraction grating Re 1 on the lower side of the pupil expansion diffraction grating EX1 and the exit-side diffraction grating EX2, which is an opposite side of the incident-side diffraction grating IN. Moreover, the diffraction gratings according to Modified Example 6 of the present embodiment include a recycler diffraction grating Re 2 on the right side surfaces of the pupil expansion diffraction grating EX1 and the exit-side diffraction grating EX2 and a recycler diffraction grating Re 3 on the left side surfaces of the pupil expansion diffraction grating EX1 and the exit-side diffraction grating EX2. In addition, the diffraction gratings according to Modified Example 6 of the present embodiment include recycler diffraction gratings Re 4 and Re 5 in the vicinity of the both side surfaces of the incident-side diffraction grating IN on the upper side and also include a recycler diffraction grating Re 6 on the upper side of the incident-side diffraction grating IN.

In Modified Example 6 of the present embodiment, the IN vector of the incident-side diffraction grating IN and the vectors of the recycler diffraction gratings Re 4 to Re 6 on the upper side are the same. As shown in FIG. 21B, the diffraction gratings according to this modified example 6 enable light beams at two obliquely upper points in the K-space to return to obliquely lower points. Although the layout is separated in FIG. 21B, the areas of the incident-side diffraction grating IN, the recycler diffraction grating Re 4, and the recycler diffraction grating Re 5 may be connected. Moreover, in this modified example 6, the recycler diffraction grating Re 6 to return light beams downwards is further placed in the K-space. It should be noted that this is an example and the diffraction gratings can be placed in consideration of various other closed-vector configurations.

(3) Effects of Recycler Diffraction Gratings

Figure 22A:
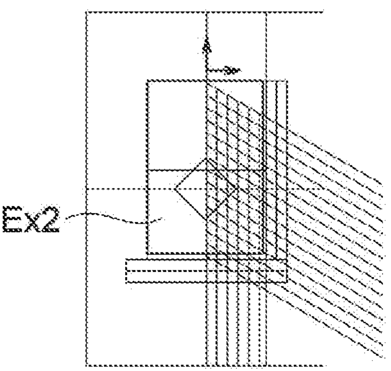
FIGS. 22A and 22B Are schematic diagrams for describing light propagation with recycler diffraction gratings according to the third embodiment of the present technology.
Figure 22B:
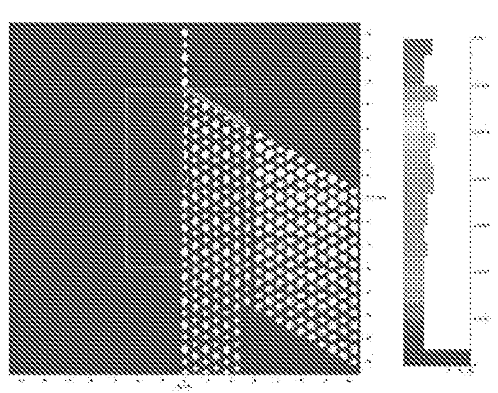
Figure 23A:
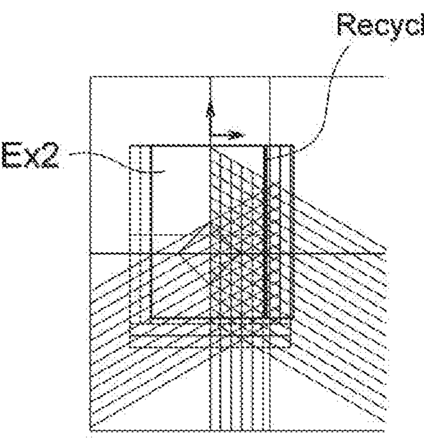
FIGS. 23A and 23B Are schematic diagrams for describing light propagation with the recycler diffraction gratings according to the third embodiment of the present technology.
Figure 23B:
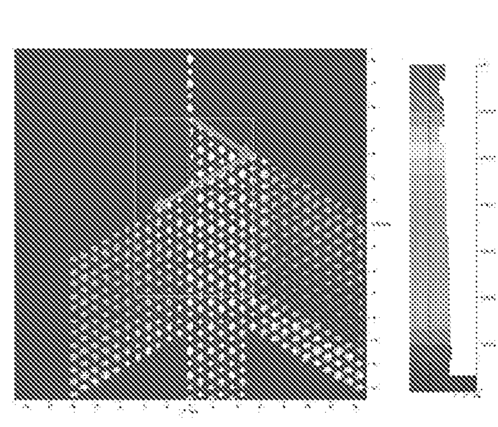

Next, effects of the recycler diffraction gratings according to the present embodiment will be described with reference to FIGS. 22 and 23. FIG. 22A is a schematic diagram showing light propagation in a case where the recycler diffraction gratings according to the present embodiment are not provided. FIG. 22B is a figure showing the case of FIG. 22A in a footprint. FIG. 23A is a schematic diagram showing light propagation in a case where the recycler diffraction gratings according to the present embodiment are provided. FIG. 23B is a figure showing the case of FIG. 23A in a footprint.

As shown in FIGS. 22A and 22B, in a case where the recycler diffraction gratings according to the present embodiment are not provided, for example, light beams entering from an obliquely left upper position, i.e., many light beams are emitted outward from the right side surfaces and the lower side of the pupil expansion diffraction grating EX1 and the exit-side diffraction grating EX2. In contrast, as shown in FIGS. 23A and 23B, in a case where the recycler diffraction gratings Re 2 according to the present embodiment are provided on the right side surfaces, for example, light beams entering from an obliquely left upper position are diffracted on the right side surfaces of the pupil expansion diffraction grating EX1 and the exit-side diffraction grating EX2. As it can be seen, the provided recycler diffraction grating Re 2 allows light beams to be diffracted and retuned.

4. Fourth Embodiment (1) Configuration Example of Diffraction Gratings

Next, a configuration example of diffraction gratings of an image display apparatus according to a fourth embodiment of the present technology will be described with reference to FIG. 24. FIG. 24A is a schematic diagram showing the configuration example of the diffraction gratings according to the present embodiment. FIG. 24B is a conceptual diagram expressing light propagation with the diffraction gratings according to the present embodiment in a K-space. In the image display apparatus according to the present embodiment, a recycler diffraction grating is arranged outside the incident-side diffraction grating IN for recycling light beam. The recycler diffraction gratings according to the present embodiment can be designed as various diffraction gratings as long as the vectors of the respective diffraction gratings are closed.

Figures 24A, 24B:
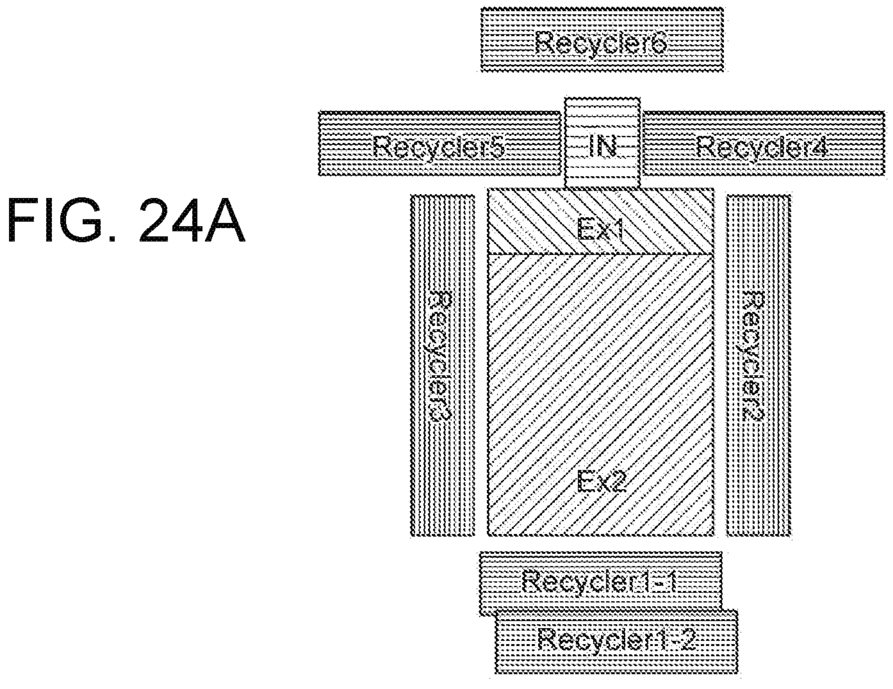
FIGS. 24A and 24B Are schematic diagrams showing light propagation with diffraction gratings according to a fourth embodiment of the present technology.

As shown in FIGS. 24A and 24B, the image display apparatus according to the present embodiment includes recycler diffraction gratings Re 1-1 and 1-2 on the lower side of the pupil expansion diffraction grating EX1 and the exit-side diffraction grating EX2, which is an opposite side of the incident-side diffraction grating IN, a recycler diffraction grating Re 2 on the right side surfaces of the pupil expansion diffraction grating EX1 and the exit-side diffraction grating EX2, a recycler diffraction grating Re 3 on the left side surfaces of the pupil expansion diffraction grating EX1 and the exit-side diffraction grating EX2. In the present embodiment, recycler diffraction gratings Re 4 and Re 5 are provided in the vicinity of the both sides of the incident-side diffraction grating IN on the upper side and a recycler diffraction grating Re 6 is provided on the upper side of the incident-side diffraction grating IN.

In the present embodiment, the recycler diffraction gratings Re 4 and Re 5 on the upper side and the recycler diffraction grating Re 6 outside the incident-side diffraction grating IN have the same vectors and have vertically downward vectors in one direction.

In accordance with the image display apparatus including the diffraction gratings according to the present embodiment, the recycler diffraction grating is provided outside the incident-side diffraction grating IN in addition to the plurality of recycler diffraction gratings, and the vectors closed by a combination of these recycler diffraction gratings and the diffraction gratings as the basic configuration are formed. The uniform image quality can be thus achieved while improving the use efficiency of incident light as in the image display apparatus 100 according to the first embodiment.

(2) Modified Examples of Diffraction Gratings

Figure 25A:
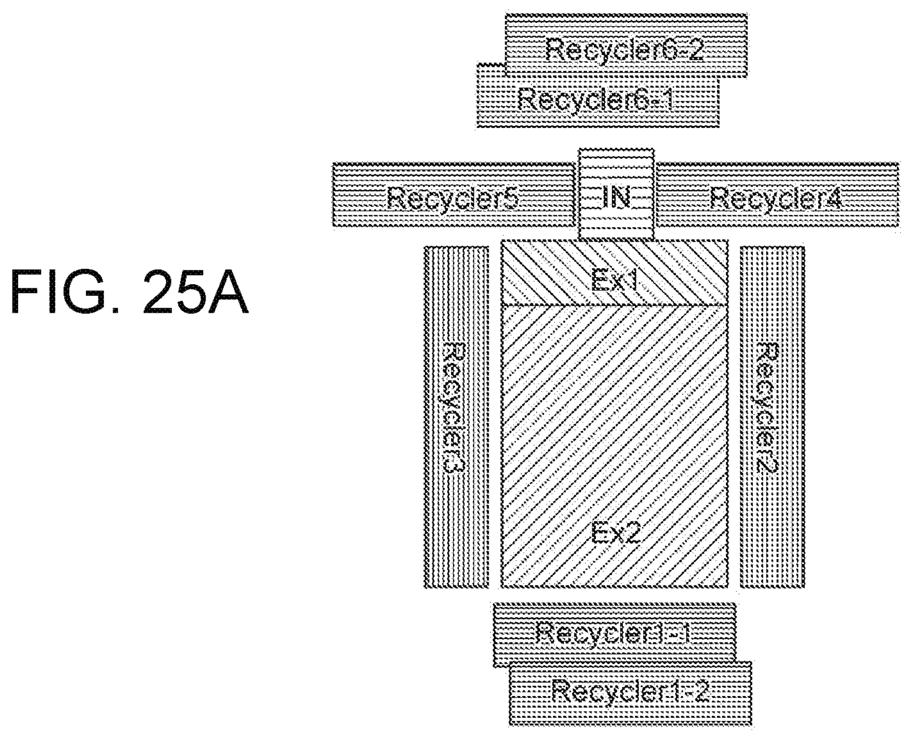
FIGS. 25A and 25B Are schematic diagrams showing light propagation according to a modified example of the diffraction grating according to the fourth embodiment of the present technology.
Figure 25B:
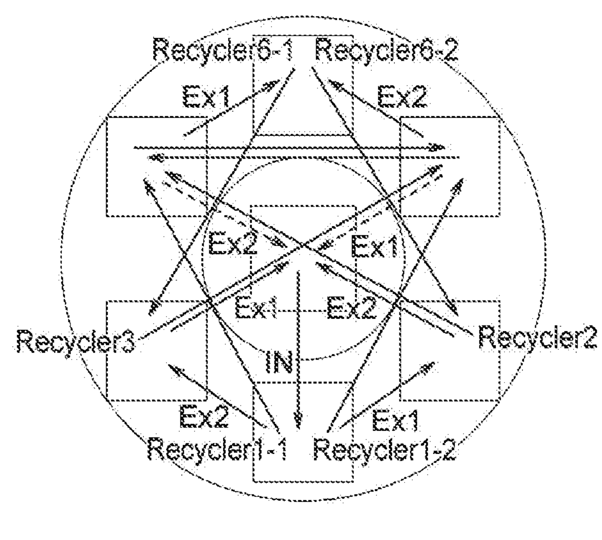
Figure 26A:
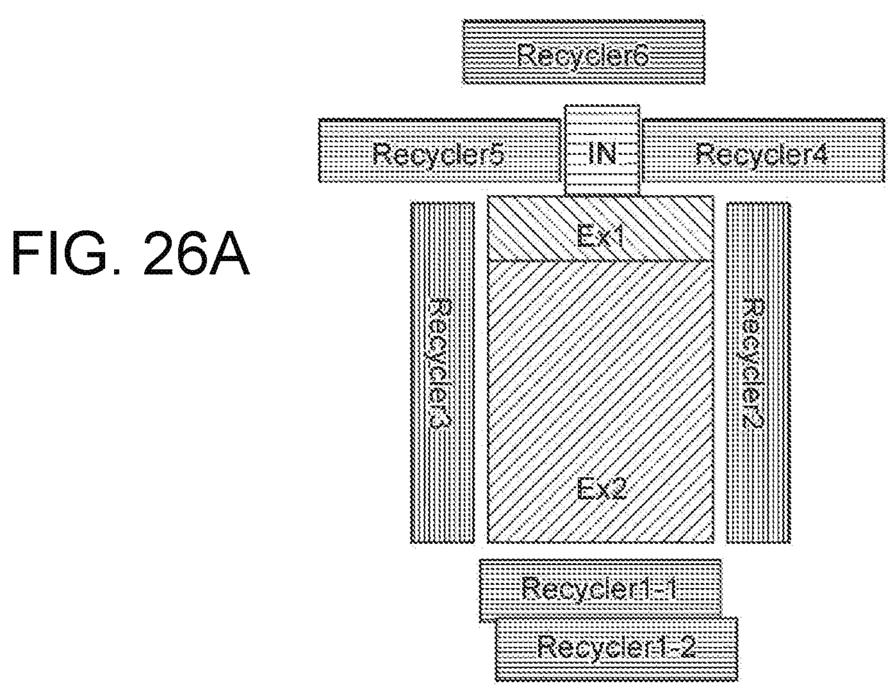
FIGS. 26A and 26B Are schematic diagrams showing light propagation according to a modified example of the diffraction grating according to the fourth embodiment of the present technology.
Figure 26B:
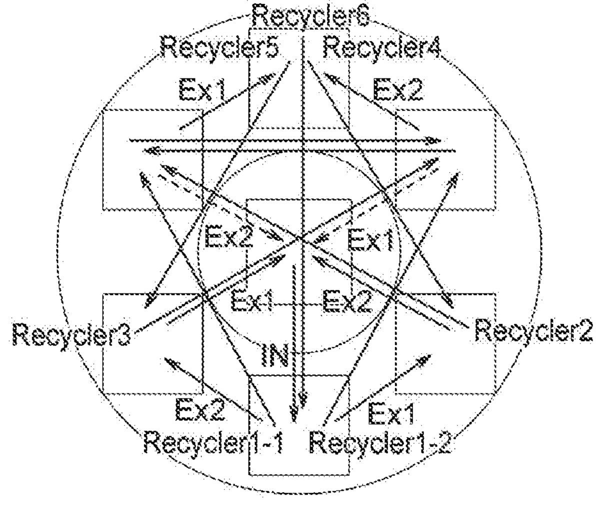

Next, diffraction gratings according to Modified Examples 1 and 2 of the present embodiment will be described with reference to FIGS. 25 and 26. FIG. 25A and FIG. 26A are schematic diagrams showing a configuration example of the diffraction gratings according to Modified Examples 1 and 2 of the present embodiment. FIG. 25B to FIG. 26B are conceptual diagrams expressing light propagation with the diffraction gratings according to Modified Examples 1 and 2 of the present embodiment in a K-space.

The diffraction gratings according to Modified Example 1 shown in FIGS. 25A and 25B include recycler diffraction gratings Re 1-1 and 1-2 and recycler diffraction gratings Re 2 to Re 5 similar to the diffraction gratings according to the present embodiment. Moreover, the diffraction gratings according to Modified Example 1 of the present embodiment include a recycler diffraction grating Re 6 on the upper side of the incident-side diffraction grating IN on the upper side. In Modified Example 1 of the present embodiment, the recycler diffraction gratings Re 4 and Re 5 on the upper side and the recycler diffraction grating Re 6 outside the incident-side diffraction grating IN have the same vectors and have vertically downward vectors in two directions.

The diffraction gratings according to Modified Example 2 shown in FIGS. 26A and 26B include the recycler diffraction gratings Re 1-1 and 1-2 and the recycler diffraction gratings Re 2 to Re 6 similar to the diffraction gratings according to the present embodiment. In Modified Example 2 of the present embodiment, in the present embodiment, the recycler diffraction gratings Re 4 and Re 5 on the upper side and the recycler diffraction grating Re 6 outside the incident-side diffraction grating IN have different vectors. It should be noted that these are examples and various combinations may be employed as long as the vectors can be closed. The design can be performed in consideration of efficiency, manufacturability, uniformity, etc.

Although the above-mentioned embodiments are all shown using the example in which the exit-side diffraction grating EX2 is arranged on the front surface side that is the front side and the pupil expansion diffraction grating EX1 is arranged on the back surface side that is the deep side, such an arrangement may be opposite. Moreover, the front and back relationship of the recycler diffraction gratings is not limited, and can be arbitrarily chosen in consideration of manufacturing easiness, design easiness, efficiency, uniformity, etc.

5. Fifth Embodiment

Figure 27:
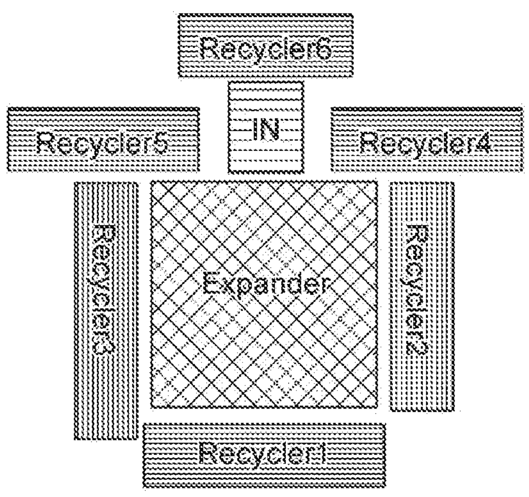
FIGS. 27 A schematic diagram showing a configuration example of diffraction gratings according to a fifth embodiment of the present technology.

Next, a configuration example of diffraction gratings of an image display apparatus according to a fifth embodiment of the present technology will be described with reference to FIG. 27. FIG. 27 is a schematic diagram showing the configuration example of the diffraction gratings according to the present embodiment. Although the double-sided configuration example has been described in each of the above-mentioned embodiments, an example of application to a two-dimensional surface-relief diffraction grating (SRG) is described in the present embodiment.

As shown in FIG. 27, the image display apparatus according to the present embodiment includes a recycler diffraction grating Re 1 on the lower side of the exit-side diffraction grating EX2, which is an opposite side of the incident-side diffraction grating IN, a recycler diffraction grating Re 2 on the right side surface of the exit-side diffraction grating EX2, and a recycler diffraction grating Re 3 on the left side surface of the exit-side diffraction grating EX2. In the present embodiment, recycler diffraction gratings Re 4 and Re 5 are provided in the vicinity of the both sides of the incident-side diffraction grating IN on the upper side and a recycler diffraction grating Re 6 is provided on the upper side of the incident-side diffraction grating IN.

In accordance with the image display apparatus according to the present embodiment, the manufacturability can be improved in addition to effects similar to those of the image display apparatus 100 according to the first embodiment because the gratings are all designed on one surface.

6. Sixth Embodiment

Figure 28:
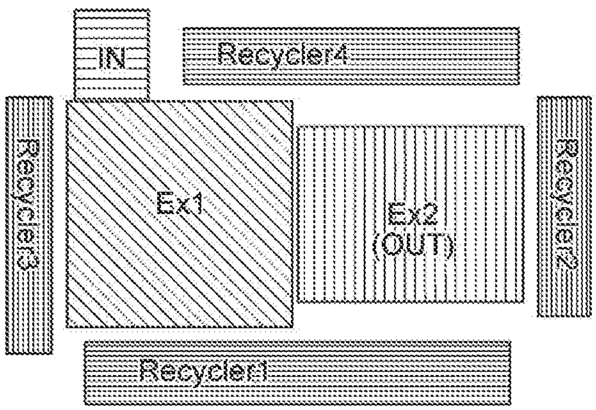
FIG. 28 A schematic diagram showing a configuration example of diffraction gratings according to a sixth embodiment of the present technology.

Next, a configuration example of diffraction gratings of an image display apparatus according to a sixth embodiment of the present technology will be described with reference to FIG. 28. FIG. 28 is a schematic diagram showing the configuration example of the diffraction gratings according to the present embodiment. In the present embodiment, an example of application to the traditional two-axis technique is described.

As shown in FIG. 28, the image display apparatus according to the present embodiment includes an incident-side diffraction grating IN and a pupil expansion diffraction grating EX1 and an exit-side diffraction grating EX2 that are arranged side by side on a two-dimensional plane. Moreover, the image display apparatus according to the present embodiment includes a recycler diffraction grating Re 1 on the lower side of the exit-side diffraction grating EX2, which is an opposite side of the incident-side diffraction grating IN, a recycler diffraction grating Re 2 on the right side surface of the exit-side diffraction grating EX2, and a recycler diffraction grating Re 3 on the left side surface of the exit-side diffraction grating EX2. In the present embodiment, the image display apparatus further includes a recycler diffraction grating Re 4 in the vicinity of the side surface of the incident-side diffraction grating IN on the upper side.

In accordance with the image display apparatus according to the present embodiment, a great advantage is provided because there are many design results and manufacturing results in addition to effects similar to those of the image display apparatus 100 according to the first embodiment. It should be noted that the light guide plate 103 increases in size, which should be taken into consideration.

7. Seventh Embodiment

Figure 29:
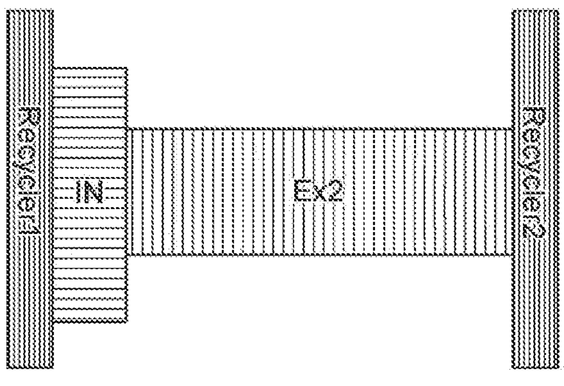
FIG. 29 A schematic diagram showing a configuration example of diffraction gratings according to a seventh embodiment of the present technology.
Figure 30A:
FIGS. 30A-30G Are schematic diagrams showing configuration examples of a diffraction grating surface according to an eighth embodiment of the present technology.
Figure 30A:
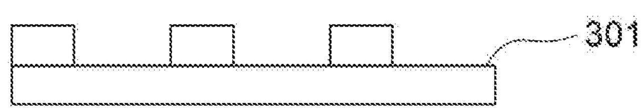
Figure 30B:
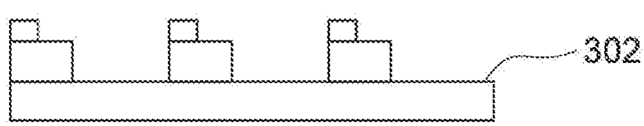
Figure 30C:
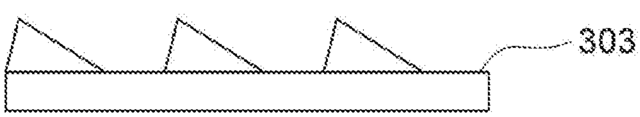
Figure 30D:
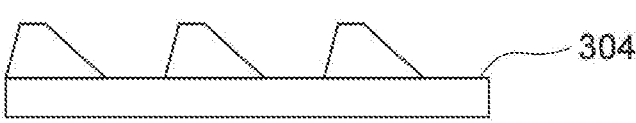
Figure 30E:
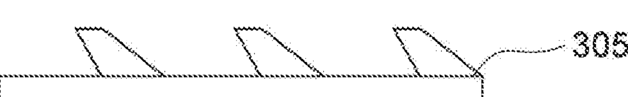
Figure 30F:
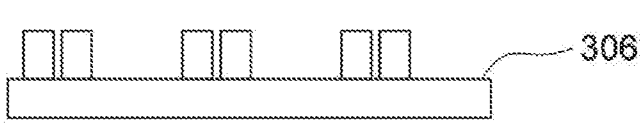
Figure 30G:
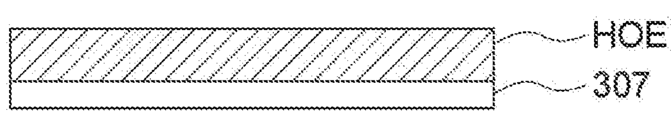

Next, a configuration example of diffraction gratings of an image display apparatus according to a seventh embodiment of the present technology will be described with reference to FIG. 29. FIG. 29 is a schematic diagram showing an example of placing diffraction gratings in the image display apparatus according to the present embodiment. In the present embodiment, an example of application to the single-axis technique is described.

As shown in FIG. 29, the image display apparatus according to the present embodiment includes an incident-side diffraction grating IN and an exit-side diffraction grating EX2. The image display apparatus according to the present embodiment further includes a recycler diffraction grating Re 1 on the left side surface outside the incident-side diffraction grating IN and a recycler diffraction grating Re 2 on the right side surface of the exit-side diffraction grating EX2, which is an opposite side of the incident-side diffraction grating IN.

In accordance with the image display apparatus according to the present embodiment, the uniform image quality can be achieved while improving the use efficiency of incident light as in the image display apparatus 100 according to the first embodiment.

As to the arrangement of the incident-side diffraction grating IN, the incident-side diffraction grating IN may be arranged not only on the upper side, but also on the left side as in the present embodiment or in a direction clockwisely or counter-clockwisely rotated by 90 degrees or other angle as a whole. This can be arbitrarily chosen in consideration of where the optical engine is placed and the size of the entire apparatus. Moreover, the diffraction gratings are also not limited to those of the present embodiment. It is sufficient that the vectors of the respective diffraction gratings are closed. The diffraction gratings can be arbitrarily designed in consideration of layout, size, and shape that can improve the efficiency.

8. Eighth Embodiment

Next, a configuration example of diffraction gratings of an image display apparatus according to an eighth embodiment of the present technology will be described with reference to FIG. 30. FIG. 30 is a schematic diagram showing configuration examples of the surface of the surface-relief diffraction grating according to the present embodiment.

As shown in FIGS. 30A to 30G, a binary diffraction grating 301, an echelle diffraction grating 302, a blazed diffraction grating 303, a trapezoid diffraction grating 304, a slanted diffraction grating 305, a metasurface diffraction grating 306, and a diffraction grating 307 using a holographic optical element (HOE), for example, can be applied as the diffraction gratings of the image display apparatus according to the present embodiment.

In a case of using the echelle type, blazed type, the trapezoid type, the slanted type, the metasurface type, or the HOE, employing an asymmetric shape can provide the diffraction efficiency with respect to the incident direction with an asymmetric property, and the diffraction efficiency can be increased in a necessary direction in consideration of ray paths. Moreover, in a case of the binary type, the echelle type, the blazed type, the trapezoid type, or the metasurface type, not providing the asymmetric property but providing symmetric diffraction efficiency in both directions at the incident angle can serve to expand light beams in the both directions in the second diffraction gratings (e.g., the pupil expansion diffraction grating EX1 and the exit-side diffraction grating EX2). As to the recycler diffraction grating, it is desirable to provide an asymmetric property so as to improve the diffraction efficiency in the direction to return light because the recycler diffraction grating functions as the vector in one direction.

9. Ninth Embodiment

Next, a configuration example of diffraction gratings of an image display apparatus according to a ninth embodiment of the present technology will be described with reference to FIG. 31. FIG. 31 is a schematic diagram showing configuration examples of the surface of the surface-relief diffraction grating according to the present embodiment. In the present embodiment, forming a film on the surface-relief diffraction grating can provide an effect of improving the image quality.

As shown in FIGS. 31A to 31E, a diffraction grating 311 with a coating on its front surface, a diffraction grating 312 with a uniform thickness coating, a diffraction grating 313 with a coating only on its convex portions and bottom surface, a diffraction grating 314 with a coating whose thickness varying depending on its surfaces, and a diffraction grating 315 with a coating in the form of a multi-layer film, for example, can be applied as the diffraction gratings of the image display apparatus according to the present embodiment. It should be noted that all the diffraction gratings may have different coatings or may have no coating.

Covering the front surface of the diffraction grating with the film can increase the necessary diffraction efficiency or lower the necessary diffraction efficiency or can achieve both. Moreover, covering the entire front surface of the diffraction grating with the film allows the diffraction grating to act like a volume hologram, it can also increase the diffraction efficiency selectivity for wavelength and angle. Moreover, applying the film on one surface can provide more effects because it further enhances the asymmetric property. In addition, providing the multi-layer film can further enhance the above effects. In particular, providing the selectivity can provide more effects.

10. Tenth Embodiment

Figure 32A:
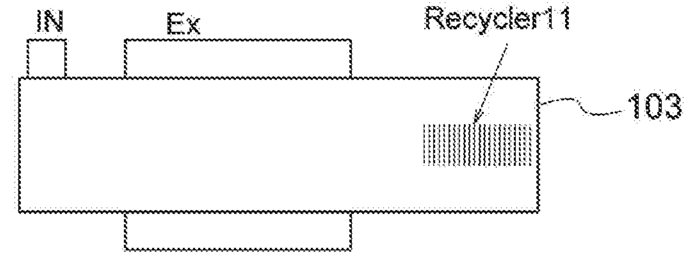
FIGS. 32A-32C Are schematic diagrams showing an arrangement example of diffraction gratings according to a tenth embodiment of the present technology.
Figure 32B:
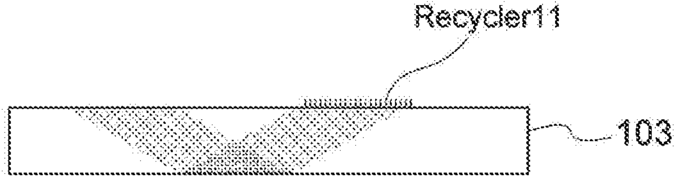
Figure 32C:
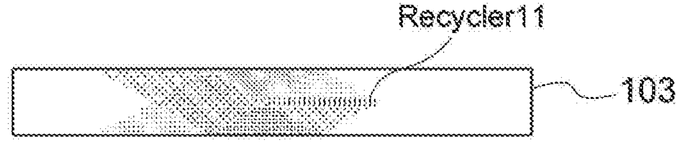

Next, a configuration example of diffraction gratings of an image display apparatus according to a tenth embodiment of the present technology will be described with reference to FIG. 32. FIG. 32A is a schematic diagram showing arrangement examples of the recycler diffraction grating in the image display apparatus according to the present embodiment. FIG. 32B is a schematic diagram showing light beam paths in a case where the recycler diffraction grating is arranged on a front surface of the light guide plate. FIG. 32C is a schematic diagram showing light beam paths in a case where the recycler diffraction grating arranged inside the light guide plate.

As shown in FIG. 32A, the image display apparatus according to the present embodiment includes a light guide plate 103, an exit-side diffraction grating EX2, an incident-side diffraction grating IN, and a recycler diffraction grating Re 11. The recycler diffraction grating Re 11 arranged inside the light guide plate 103, not on the front surface of the light guide plate 103.

The diffraction grating does not necessarily need to be on the front surface of the light guide plate. The diffraction grating may be placed inside the light guide plate 104. As shown in FIG. 32B, in a case where the recycler diffraction grating Re 11 is arranged on the front surface of the light guide plate 103, the light beam incident surface onto the recycler diffraction grating Re 11 is a single surface, and the width dimension of the light flux, which depends on the pupil diameter of the optical engine and the size of the incident-side diffraction grating IN, is large. Therefore, it is difficult to reduce the non-uniformity.

In contrast, as shown in FIG. 32C, in a case where the recycler diffraction grating Re 11 arranged inside the light guide plate 103, a light beam incident surface 104 onto the recycler diffraction grating Re 11 is two upper and lower surfaces, not a single surface, and the width dimension of the light flux, which depends on the pupil diameter of the optical engine and the size of the incident-side diffraction grating IN, is small. Therefore, the non-uniformity can be reduced even with a smaller optical engine pupil or a smaller incident-side diffraction grating IN.

11. Eleventh Embodiment

Next, a configuration example of diffraction gratings of an image display apparatus according to an eleventh embodiment of the present technology will be described with reference to FIG. 33. FIG. 33A is a schematic diagram showing arrangement examples of the recycler diffraction grating in the image display apparatus according to the present embodiment. FIG. 33B is a schematic diagram showing a configuration example of the recycler diffraction grating.

As shown in FIG. 33A, a recycler diffraction grating 332 and a recycler diffraction grating 333, which are one-dimensional, can be arranged on the front and back surfaces of the light guide plate 331, respectively. As shown in FIG. 33B, as it can be seen when the recycler diffraction grating 332 and the recycler diffraction grating 333 are viewed from the front surface of the light guide plate 331, the grating shapes overlap each other.

12. Twelfth Embodiment

Figure 34A:
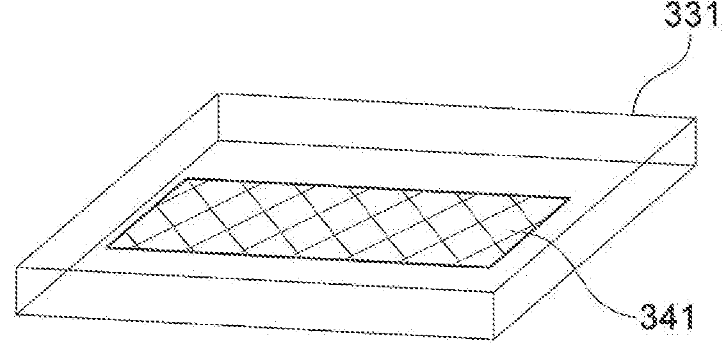
FIGS. 34A-34D Are schematic diagrams showing configuration examples of a diffraction grating according to a twelfth embodiment of the present technology.
Figure 34B:
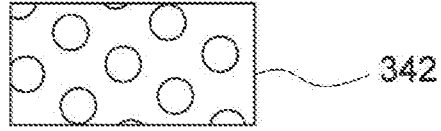
Figure 34C:
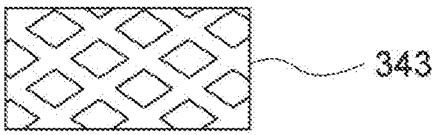
Figure 34D:
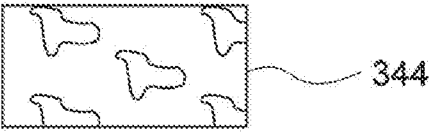

Next, a configuration example of diffraction gratings of an image display apparatus according to a twelfth embodiment of the present technology will be described with reference to FIG. 34. FIG. 34A is a schematic diagram showing arrangement examples of the recycler diffraction grating in the image display apparatus according to the present embodiment. FIGS. 34B to 34D are schematic diagrams showing configuration examples of the recycler diffraction grating.

As shown in FIG. 34A, a two-dimensional recycler diffraction grating 341 can be arranged on the front surface of the light guide plate 331. A diffraction grating in a stereoscopic, obliquely mesh shape is formed as the recycler diffraction grating 341. As shown in FIG. 34B, a diffraction grating with columnar shapes is formed as a recycler diffraction grating 342. As shown in FIG. 34C, a diffraction grating in a stereoscopic, obliquely thick mesh shape is formed as a recycler diffraction grating 343. As shown in FIG. 34D, a diffraction grating with stereoscopic, asymmetric shapes at the bottom surface is formed as a recycler diffraction grating 344.

Not only the one-dimensional diffraction grating but also the two-dimensional diffraction grating may be arranged as recycler diffraction gratings similar to the recycler diffraction gratings 341 to 344. This enables one entire surface to achieve diffraction in both directions. Moreover, as to the two-dimensional diffraction grating, optimal diffraction efficiency design can be performed by employing an arbitrary shape for a metasurface, which may be rectangular or circular, as the shape of each element.

13. Thirteenth Embodiment

Figures 35A, 35B, 35C, 35D:
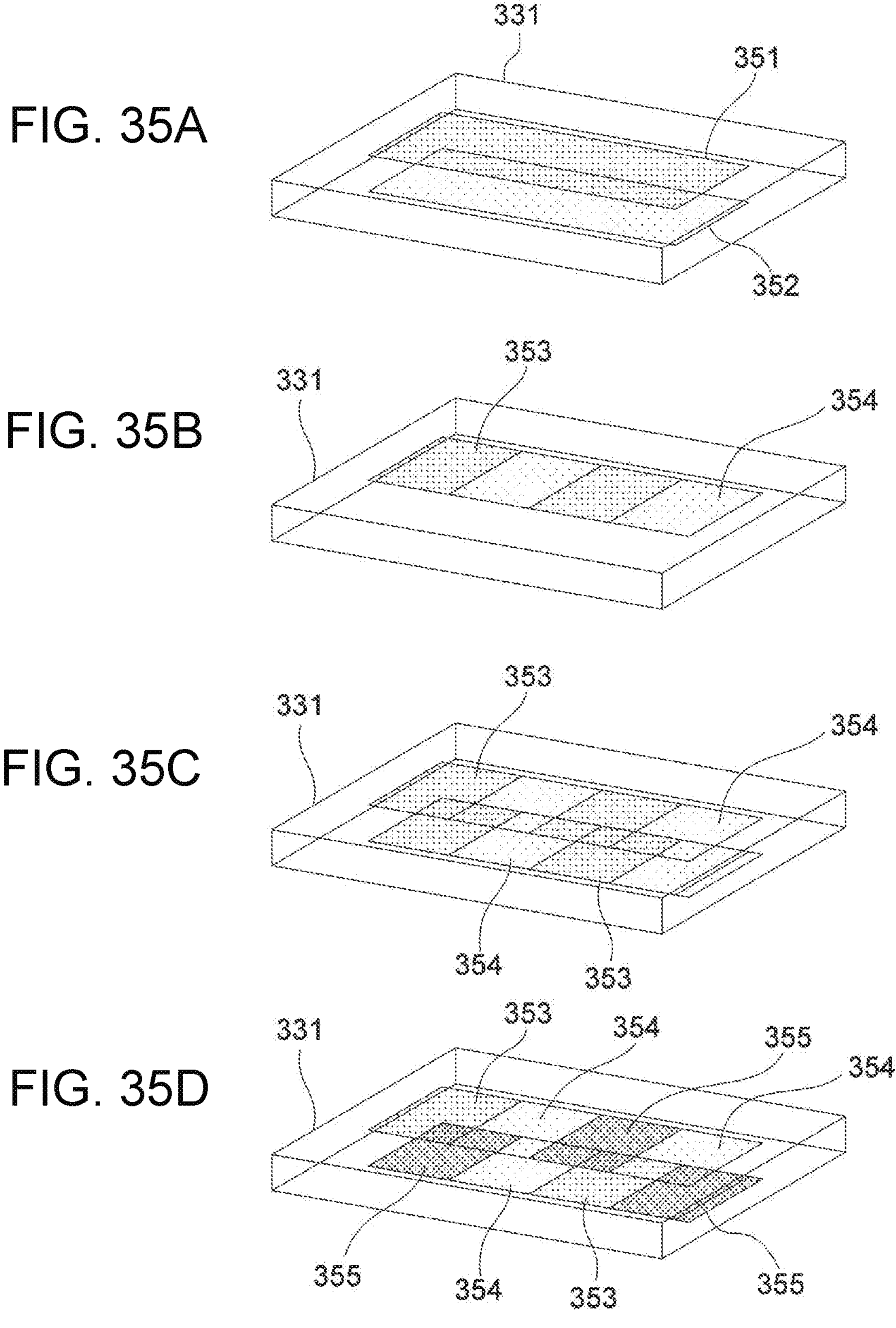
FIGS. 35A-35D Are schematic diagrams showing configuration examples of diffraction gratings according to a thirteenth embodiment of the present technology.
Figure 36:
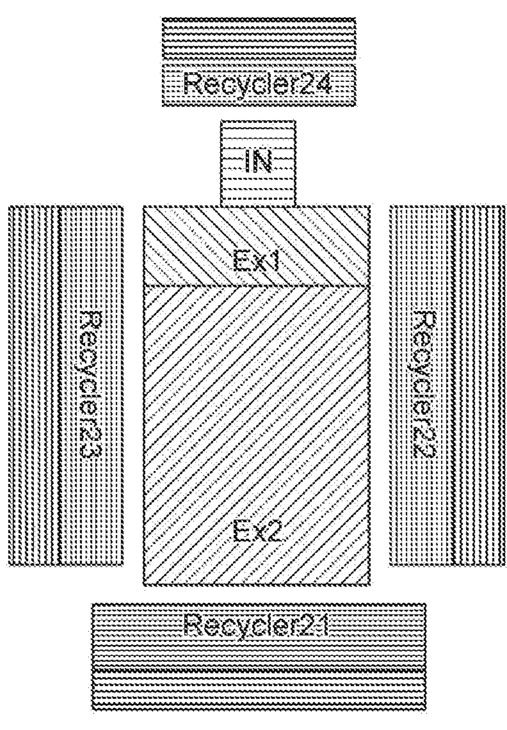
FIG. 36 A schematic diagram showing an arrangement example of diffraction gratings according to a thirteenth embodiment of the present technology.

Next, a configuration example of the diffraction grating according to a thirteenth embodiment of the present technology will be described with reference to FIGS. 35 and 36. FIGS. 35 A to 35D are schematic diagrams showing the configuration example of the diffraction gratings according to the present embodiment. FIG. 36 is a schematic diagram showing the diffraction gratings according to the arrangement example of the present embodiment.

As to the recycler diffraction grating, for example, in a case where two types of recycler diffraction gratings on the lower side are required, they may be arranged with their area divided. As shown in FIG. 35A, in the present embodiment, for example, a light guide plate 331 and a recycler diffraction grating 351 and a recycler diffraction grating 352, which are respectively arranged on the front and back surfaces of the light guide plate 331, are provided. The recycler diffraction grating 351 and the recycler diffraction grating 352 are each formed with a single vector arrangement without dividing the area.

As shown in FIG. 35B, in the present embodiment, a light guide plate 331 and diffraction gratings, which are divided and alternately arranged areas of a recycler diffraction grating 353 and a recycler diffraction grating 354 on the front surface of the light guide plate 331, are provided as an example.

As shown in FIG. 35C, in the present embodiment, a light guide plate 331 and diffraction gratings, which are divided and alternately arranged areas of a recycler diffraction grating 353 and a recycler diffraction grating 354 on the front surface of the light guide plate 331, are provided as an example. Moreover, in the present embodiment, diffraction gratings, which are a recycler diffraction grating 354 and a recycler diffraction grating 353 alternately arranged in divided area on the back surface of the light guide plate 331, are provided.

As shown in FIG. 35D, in the present embodiment, a light guide plate 331 and diffraction gratings, which are a recycler diffraction grating 353, a recycler diffraction grating 354, a recycler diffraction grating 355, and a recycler diffraction grating 354 arranged in divided areas on the front surface of the light guide plate 331, are provided as an example. Diffraction gratings, which are a recycler diffraction grating 355, a recycler diffraction grating 354, a recycler diffraction grating 353, and a recycler diffraction grating 355 arranged in divided areas on the back surface of the light guide plate 331, are also provided.

FIGS. 35B to 35D show a case where the area is divided at equal spacings. The area may be divided into left and right areas. Arbitrary area division and adjustment can be performed in consideration of the efficiency. Moreover, the figures show only an example in which there are two types of diffraction grating vectors in a single place. As shown in FIG. 35 D, three types of diffraction grating vectors may be used. They can be arranged by arbitrary area division.

As shown in FIG. 36, the image display apparatus according to the present embodiment includes an incident-side diffraction grating IN, a pupil expansion diffraction grating EX1, and an exit-side diffraction grating EX2. Moreover, the image display apparatus according to the present embodiment includes a recycler diffraction grating Re 21 on the lower side of the pupil expansion diffraction grating EX1 and the exit-side diffraction grating EX2, a recycler diffraction grating Re 22 on the right side surfaces of the pupil expansion diffraction grating EX1 and the exit-side diffraction grating EX2, a recycler diffraction grating Re 23 on the left side surfaces of the pupil expansion diffraction grating EX1 and the exit-side diffraction grating EX2, and a recycler diffraction grating Re 24 on the upper side, which is outside the incident-side diffraction grating IN.

As to the recycler diffraction gratings Re 21 to Re 24, two types of diffraction grating vectors are arranged in divided areas. In this manner, respectively arbitrarily designed recycler diffraction gratings can be arranged in the present embodiment.

14. Fourteenth Embodiment

Figure 37:
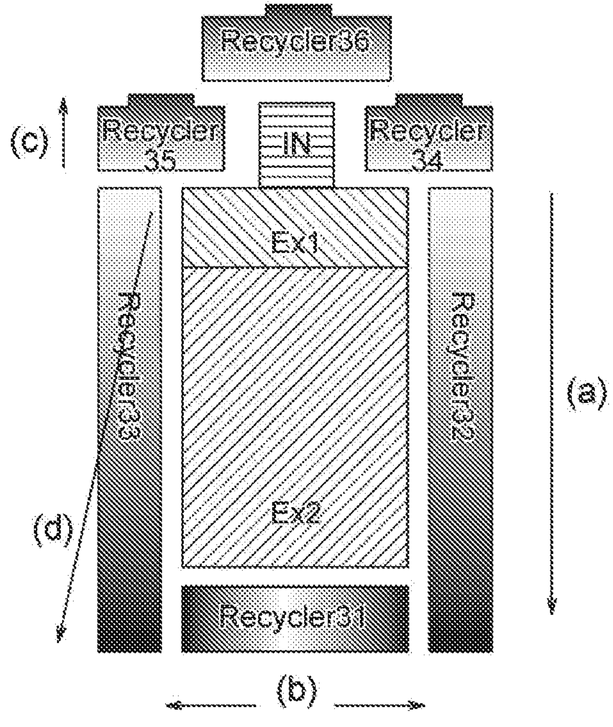
FIG. 37 A schematic diagram showing an arrangement example of diffraction gratings according to a fourteenth embodiment of the present technology.
Figure 38A:
FIGS. 38A-38D Are schematic diagrams showing configuration examples of a diffraction grating according to a fifteenth embodiment of the present technology.
Figure 38A:
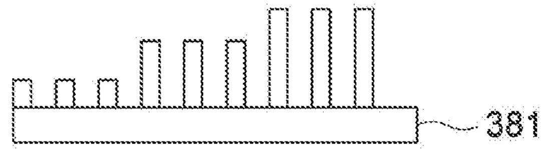
Figure 38B:
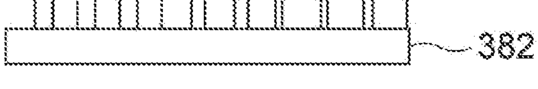
Figure 38C:
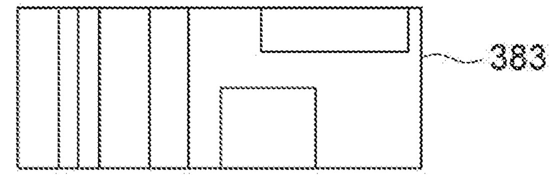
Figure 38D:
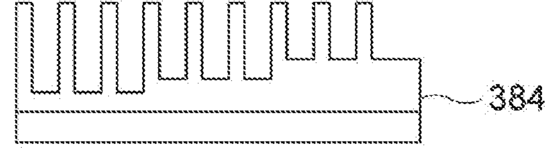

Next, arrangement examples of diffraction gratings in an image display apparatus according to a fourteenth embodiment of the present technology will be described with reference to FIG. 37. FIG. 37 is a schematic diagram showing the diffraction gratings according to the arrangement example of the present embodiment.

As shown in FIG. 37, the diffraction gratings of the present embodiment include a recycler diffraction grating Re 31 on the lower side of the pupil expansion diffraction grating EX1 and the exit-side diffraction grating EX2, which is an opposite side of the incident-side diffraction grating IN. Moreover, the diffraction gratings of the present embodiment include a recycler diffraction grating Re 32 on the right side surfaces of the pupil expansion diffraction grating EX1 and the exit-side diffraction grating EX2 and a recycler diffraction grating Re 33 on the left side surfaces of the pupil expansion diffraction grating EX1 and the exit-side diffraction grating EX2. In addition, as the diffraction gratings of the present embodiment, recycler diffraction gratings Re 34 and Re 35 are respectively provided in the vicinity of the both side surfaces of the incident-side diffraction grating IN on the upper side and a recycler diffraction grating Re 36 is provided on the upper side of the incident-side diffraction grating IN.

The recycler diffraction gratings according to the present embodiment can improve the uniformity and efficiency as a whole by varying the diffraction efficiency in the areas. Since a light beam basically becomes weaker with an increase in distance from the incident-side diffraction grating IN, design to increase the diffraction efficiency is necessary.

However, in a case where a diffraction efficiency distribution is applied to the pupil expansion diffraction grating EX1 and the exit-side diffraction grating EX2, an opposite efficiency distribution may be applied because it is first necessary to more strongly return high-intensity light hitting the recycler diffraction grating near the incident-side diffraction grating IN. Moreover, it is sometimes necessary to vary the change rate of the diffraction efficiency depending on positions in consideration of the uniformity and efficiency other than linearly changing the diffraction efficiency.

For example, in (a) of the recycler diffraction grating Re 32 on the side surfaces, the diffraction efficiency is lower on the lower side. However, at the lower right corner portion, much light is fed back from the recycler diffraction grating Re 31 on the lower side, so it is sometimes necessary to lower the diffraction efficiency at the corner portion. Moreover, as in (b) of the recycler diffraction grating Re 31, a suitable distribution may be applied depending on positions.

Moreover, an efficiency distribution shown in (c) of the recycler diffraction gratings Re 34 to Re 36 assumes a case where the recycler diffraction grating has a certain width. In a case where the light guide angle is sharp, although it depends on diffraction efficiency distribution design, light returned backwards by first diffraction on the recycler diffraction grating can return to the original angle again by re-diffraction, which can lower the efficiency. In this case, gradation to lower the diffraction efficiency for the pupil expansion diffraction grating EX1 and the exit-side diffraction grating EX2 can be applied to light beams with such an angle so as to reduce light beams that would return to the original angle again by re-diffraction. In addition, (d) of the recycler diffraction grating Re 33 considering both is possible. It should be noted that although the term "gradation" is used here, the area may be divided and the efficiency may be stepwisely varied actually for the sake of manufacture.

15. Fifteenth Embodiment

Next, a configuration example of diffraction gratings in an image display apparatus according to a fifteenth embodiment of the present technology will be described with reference to FIG. 38. FIGS. 38A to 38D are schematic diagrams showing configuration examples of the diffraction gratings in the image display apparatus according to the present embodiment.

As shown in FIGS. 38A to 38D, for example, a diffraction grating 381 that varies the diffraction efficiency by changing the height, a diffraction grating 382 that varies the diffraction efficiency by changing the duty, a diffraction grating 383 that varies the diffraction efficiency by changing the density distribution, and a diffraction grating 384 that varies the diffraction efficiency by changing the residual film thickness can be applied in the image display apparatus according to the present embodiment. In addition, the diffraction efficiency distribution may be applied by otherwise changing the shape or by a combination thereof.

It should be noted that for the sake of manufacture, the duty change of the diffraction grating 382 is desirable in view of the number of processes. However, for example, in a case of an echelle (ladder) shape, the height may be changed by changing the number of steps. Changing the height with the same shape is the easiest diffraction efficiency control.

Moreover, the refractive index of the recycler diffraction grating may be the same as the refractive index of the light guide plate. In this case, the recycler diffraction grating can be used even with a residual film thickness of 50 nm or more. The entire angle of view depending on the refractive index of the light guide plate can be used more easily as compared to a case where the refractive index of the recycler diffraction grating is lower than the refractive index of the light guide plate.

16. Sixteenth Embodiment

Figure 39:
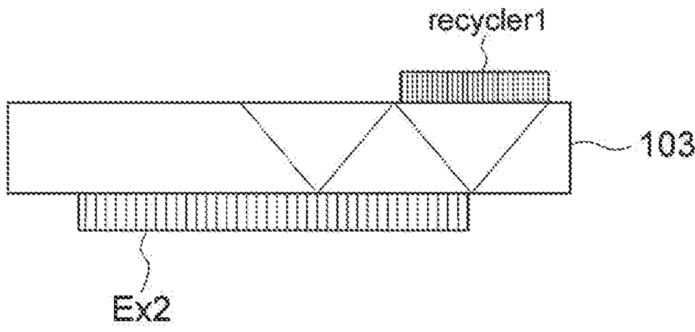
FIG. 39 A schematic diagram showing an arrangement example of diffraction gratings according to a sixteenth embodiment of the present technology.

Next, arrangement examples of diffraction gratings in an image display apparatus according to a sixteenth embodiment of the present technology will be described with reference to FIG. 39. FIG. 39 is a schematic diagram showing an arrangement example of diffraction gratings the image display apparatus according to the present embodiment.

As shown in FIG. 39, in the image display apparatus according to the present embodiment, a recycler diffraction grating Re 1 is arranged on the upper surface of the light guide plate 103 and an exit-side diffraction grating EX2 is arranged on the lower surface of the light guide plate 103. The image display apparatus according to the present embodiment can more efficiently receive light beams from the exit-side diffraction grating EX2 and return the light beams to the inside of the light guide plate 103 by changing the positional relationship between the recycler diffraction grating Re 1 and the exit-side diffraction grating EX2 so that the recycler diffraction grating Re 1 and the exit-side diffraction grating EX2 partially overlap each other in the upper and lower directions. It should be noted that the recycler diffraction grating Re 1 and the exit-side diffraction grating EX2 may be used, not overlapping each other.

17. Seventeenth Embodiment

(1) Configuration Example of Diffraction Gratings

Figure 40:
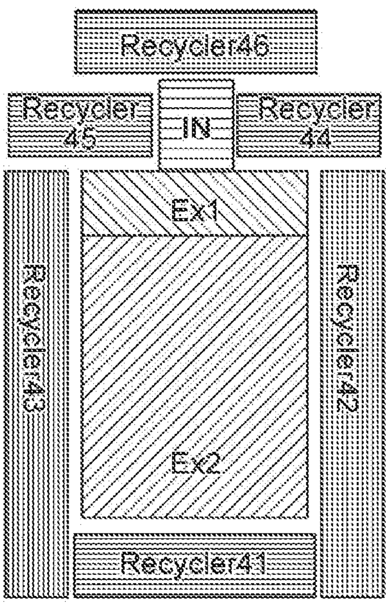
FIG. 40 A schematic diagram showing a configuration example of diffraction gratings according to a seventeenth embodiment of the present technology.

Next, a configuration example of diffraction gratings of an image display apparatus according to a seventeenth embodiment of the present technology will be described with reference to FIG. 40. FIG. 40 is a schematic diagram showing the configuration example of the diffraction gratings according to the present embodiment.

As shown in FIG. 40, the diffraction gratings of the present embodiment include a recycler diffraction grating Re 41 on the lower side of the pupil expansion diffraction grating EX1 and the exit-side diffraction grating EX2, which is an opposite side of the incident-side diffraction grating IN, a recycler diffraction grating Re 42 on the right side surfaces of the pupil expansion diffraction grating EX1 and the exit-side diffraction grating EX2, and a recycler diffraction grating Re 43 on the left side surfaces of the pupil expansion diffraction grating EX1 and the exit-side diffraction grating EX2. In addition, the diffraction gratings of the present embodiment include recycler diffraction gratings Re 44 and Re 45 in the vicinity of the both side surfaces of the incident-side diffraction grating IN on the upper side and also further include a recycler diffraction grating Re 46 on the upper side of the incident-side diffraction grating IN.

In the diffraction gratings of the present embodiment, the recycler diffraction gratings Re 42 and Re 43 on the both side surfaces extend outside the recycler diffraction grating Re 41 on the lower side.

In accordance with the image display apparatus according to the present embodiment, the uniform image quality can be achieved while improving the use efficiency of incident light as in the image display apparatus 100 according to the first embodiment.

(2) Modified Examples of Diffraction Gratings

Figure 41:
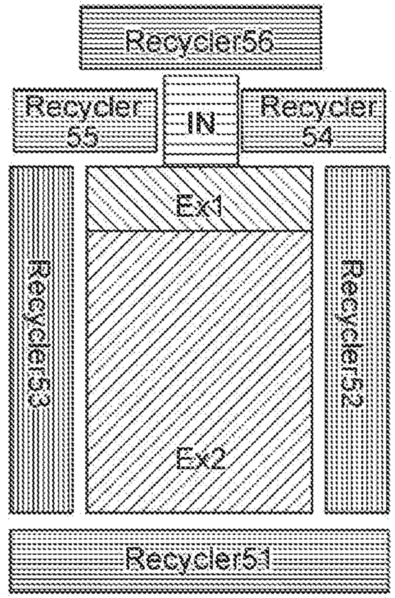
FIG. 41 A schematic diagram showing a configuration example according to a modified example of the diffraction gratings according to the seventeenth embodiment of the present technology.
Figure 42:
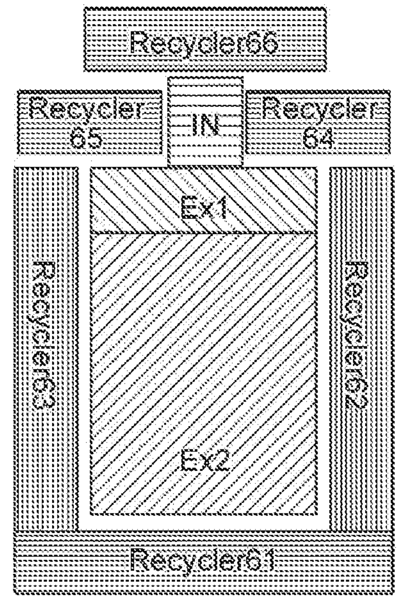
FIG. 42 A schematic diagram showing a configuration example according to a modified example of the diffraction gratings according to the seventeenth embodiment of the present technology.
Figure 43:
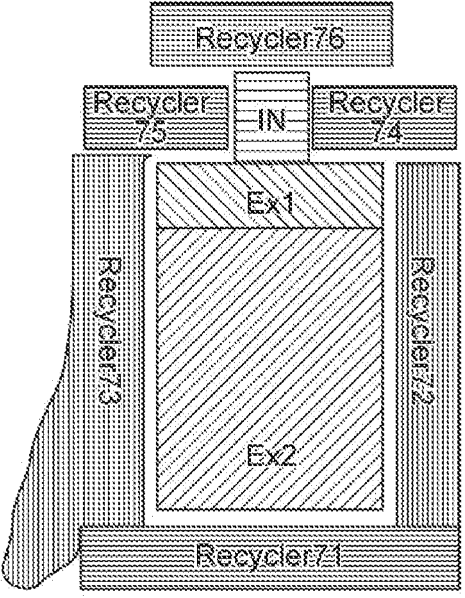
FIG. 43 A schematic diagram showing a configuration example according to a modified example of the diffraction gratings according to the seventeenth embodiment of the present technology.

Next, diffraction gratings according to Modified Examples 1 to 3 of the present embodiment will be described with reference to FIGS. 41 to 43. FIGS. 41 to 43 are schematic diagrams showing configuration examples of diffraction gratings according to Modified Examples 1 to 3 of the present embodiment.

As shown in FIG. 41, the diffraction gratings according to Modified Example 1 of the present embodiment include a recycler diffraction grating Re 51 on the lower side of the pupil expansion diffraction grating EX1 and the exit-side diffraction grating EX2, a recycler diffraction grating Re 52 on the right side surfaces of the pupil expansion diffraction grating EX1 and the exit-side diffraction grating EX2, and a recycler diffraction grating Re 53 on the left side surfaces of the pupil expansion diffraction grating EX1 and the exit-side diffraction grating EX2. In addition, the diffraction gratings according to this modified example 1 include recycler diffraction gratings Re 54 and Re 55 in the vicinity of the both side surfaces of the incident-side diffraction grating IN on the upper side and also include a recycler diffraction grating Re 56 on the upper side of the incident-side diffraction grating IN. In this modified example 1, the recycler diffraction grating Re 51 on the lower side extends with a width that covers the recycler diffraction gratings Re 52 and Re 53 on the both side surfaces.

As shown in FIG. 42, the diffraction gratings according to Modified Example 2 of the present embodiment include a recycler diffraction grating Re 61 on the lower side of the pupil expansion diffraction grating EX1 and the exit-side diffraction grating EX2, a recycler diffraction grating Re 62 on the right side surfaces of the pupil expansion diffraction grating EX1 and the exit-side diffraction grating EX2, and a recycler diffraction grating Re 63 on the left side surfaces of the pupil expansion diffraction grating EX1 and the exit-side diffraction grating EX2. In addition, the diffraction gratings according to this modified example 2 include recycler diffraction gratings Re 64 and Re 65 in the vicinity of the both side surfaces of the incident-side diffraction grating IN on the upper side and also include a recycler diffraction grating Re 66 on the upper side of the incident-side diffraction grating IN. In this modified example 2, the recycler diffraction grating Re 61 on the lower side and the recycler diffraction gratings Re 62 and Re 63 on the both side surfaces overlap each other, using the front and back surfaces.

As shown in FIG. 42, the diffraction gratings according to Modified Example 3 of the present embodiment include a recycler diffraction grating Re 71 on the lower side of the pupil expansion diffraction grating EX1 and the exit-side diffraction grating EX2, a recycler diffraction grating Re 72 on the right side surfaces of the pupil expansion diffraction grating EX1 and the exit-side diffraction grating EX2, and a recycler diffraction grating Re 73 on the left side surfaces of the pupil expansion diffraction grating EX1 and the exit-side diffraction grating EX2. In addition, the diffraction gratings according to this modified example 3 include recycler diffraction gratings Re 74 and Re 75 in the vicinity of the both side surfaces of the incident-side diffraction grating IN on the upper side and also include a recycler diffraction grating Re 76 on the upper side of the incident-side diffraction grating IN. In this modified example 3, the recycler diffraction grating Re 73 on the left side surfaces can be formed in a free shape in consideration of the light beam paths.

The above-mentioned recycler diffraction gratings may be arranged on the both surfaces or one surface or may be arranged by a combination thereof. Arranging the recycler diffraction gratings on the both surfaces can further increase the returning efficiency, though it can increase the process steps and the difficulty. Moreover, for example, placing the recycler diffraction gratings on the side surfaces and the recycler diffraction grating on the lower side on opposed surfaces so as to allow an overlapping portion as viewed from above can effectively provide each area and efficiently use it.

Various patterns can be employed as the areas in which the respective recycler diffraction gratings are placed. For example, the recycler diffraction grating on the lower side may have a width smaller than the distance between the recycler diffraction gratings on the side surfaces. In this case, the effects of the recycler diffraction gratings on the side surfaces can be strongly provided. The shape can be determined in consideration of a case where many light beams are emitted in side surface directions and light beam directions at the corner portions. It should be noted that the boundary line of each recycler diffraction grating does not need to be a straight line and also does not need to be limited to the vertical or horizontal line. Moreover, the shape of the recycler diffraction grating also does not need to be rectangular, and the recycler diffraction grating can be suitably designed in consideration of light beams to be guided and returning ray paths.

18. Eighteenth Embodiment

Next, a configuration example of diffraction gratings of an image display apparatus according to an eighteenth embodiment of the present technology will be described with reference to FIG. 44. FIGS. 44A and 44B are schematic diagrams showing the configuration example of the recycler diffraction gratings in the image display apparatus according to the present embodiment.

Figure 44A:
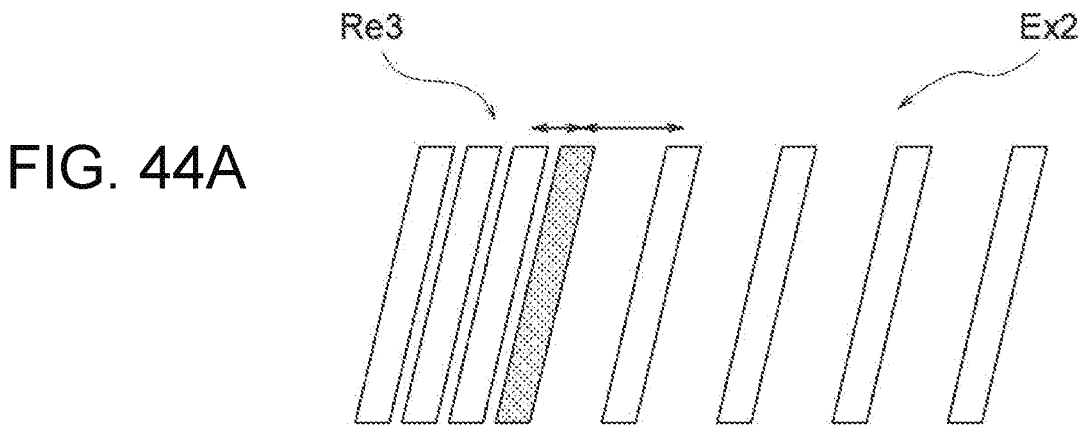
FIGS. 44A and 44B Are schematic diagrams showing configuration examples of diffraction gratings according to an eighteenth embodiment of the present technology.
Figure 44B:
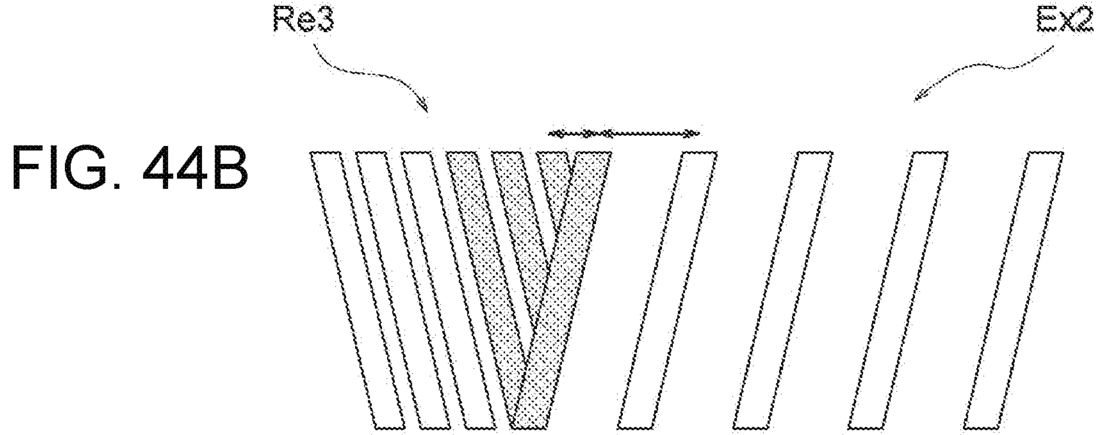

As shown in FIG. 44A, some grating elements at the boundary between the recycler diffraction grating Re 3 and the exit-side diffraction grating EX2 can be integrated, completely overlapping each other. Moreover, as shown in FIG. 44B, some grating elements at the boundary between the recycler diffraction grating Re 3 and the exit-side diffraction grating EX2 can be integrated, having overlapping portions.

The spacings of the diffraction gratings may be set to be equal to or smaller than 0.5 mm so that they are completely in contact. It increases the manufacturing difficulty but it enables downsizing, and it can further reduce light beams escaping from a gap from the recycler diffraction grating. In particular, a case where there is no boundary is a case where the diffraction grating elements are oriented in the same direction and the diffraction grating elements at the ends serve as the diffraction grating elements on the both side surfaces at the boundary. Moreover, the diffraction gratings may be in contact. It should be noted that all the recycler diffraction gratings do not necessarily need to be arranged, and some of the recycler diffraction gratings may be omitted if they do not sufficiently function in accordance with the light beam paths.

Here, the recycler diffraction grating, an in-coupling grating (ICG), and an expander may have different refractive indices. Controlling the refractive index can also control the diffraction efficiency, the diffraction efficiency distribution, the recycle angle range, and the like. For example, lowering the refractive index of the recycler diffraction grating can narrow the angle of view range to be recycled so that only a particular angle range can be effectively recycled. On the contrary, increasing the refractive index of the recycler diffraction grating may return light at a high efficiency in the entire angle of view range.

19. Nineteenth Embodiment

Figure 45A:
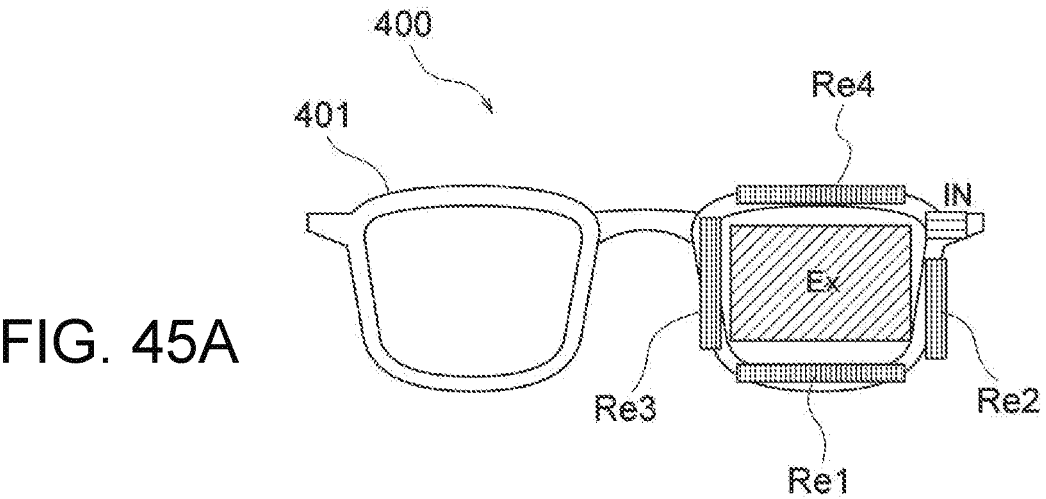
FIGS. 45A and 45B Are schematic diagrams showing a configuration example of an image display apparatus including diffraction gratings according to a nineteenth embodiment of the present technology.
Figure 45B:
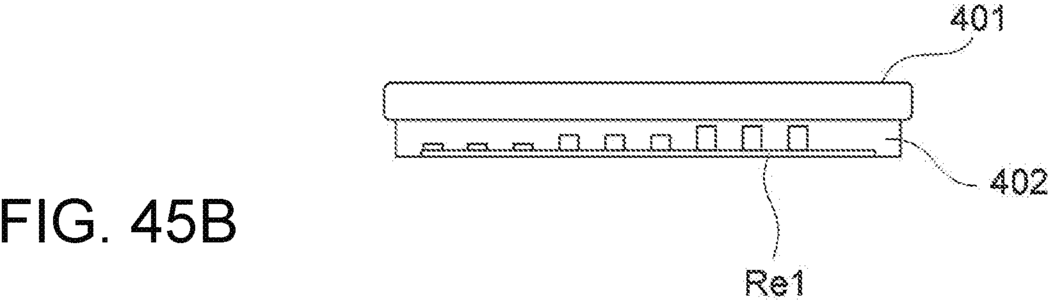

Next, a configuration example of an image display apparatus including diffraction gratings according to a nineteenth embodiment of the present technology will be described with reference to FIG. 45. FIG. 45A is a front schematic diagram showing a configuration example of the image display apparatus including the diffraction gratings according to the present embodiment. FIG. 45B is a top schematic diagram showing a configuration example of the image display apparatus including the diffraction gratings according to the present embodiment.

As shown in FIGS. 45A and 45B, an image display apparatus 400 according to the present embodiment is an eyeglasses type eyewear and includes an eyeglasses frame 401 and an incident-side diffraction grating IN arranged outside the eyeglasses frame 401. Moreover, the image display apparatus 400 includes an exit-side diffraction grating EX2 arranged in a portion in which a lens of the eyeglasses frame 401 is inserted. Then, recycler diffraction gratings Re 1 to Re 4 are arranged at positions on the eyeglasses frame 401 in the periphery of the exit-side diffraction grating EX2.

The recycler diffraction gratings Re 1 to Re 4 are arranged at positions hidden behind the eyeglasses frame 401 as viewed from the front of the image display apparatus 400 and an adhesive and paste-like metal coating 402 is applied between each recycler diffraction grating and the eyeglasses frame 401. Such a configuration allows the metal coating 402 that could not be normally applied.

The recycler diffraction gratings Re 1 to Re 4 hidden behind the eyeglasses frame 401 do not need to be transparency. Therefore, the recycler diffraction gratings Re 1 to Re 4 can be increased in reflectance with a metal coating such as aluminum and silver. It should be noted that no coating may be applied or a transparent coating may be applied. In addition, a reinforcing effect for retaining or against detachment between the eyeglasses frame 401 and the light guide plate can be provided because the coating also serves as an adhesive.

20. Twentieth Embodiment

Next, a configuration example of an image display apparatus including diffraction gratings according to a twentieth embodiment of the present technology will be described with reference to FIG. 46. FIG. 46A is a schematic diagram showing the configuration example of the diffraction gratings according to the present embodiment. FIG. 46B is a front schematic diagram showing a configuration example of the image display apparatus including the diffraction gratings according to the present embodiment.

Figures 46A, 46B:
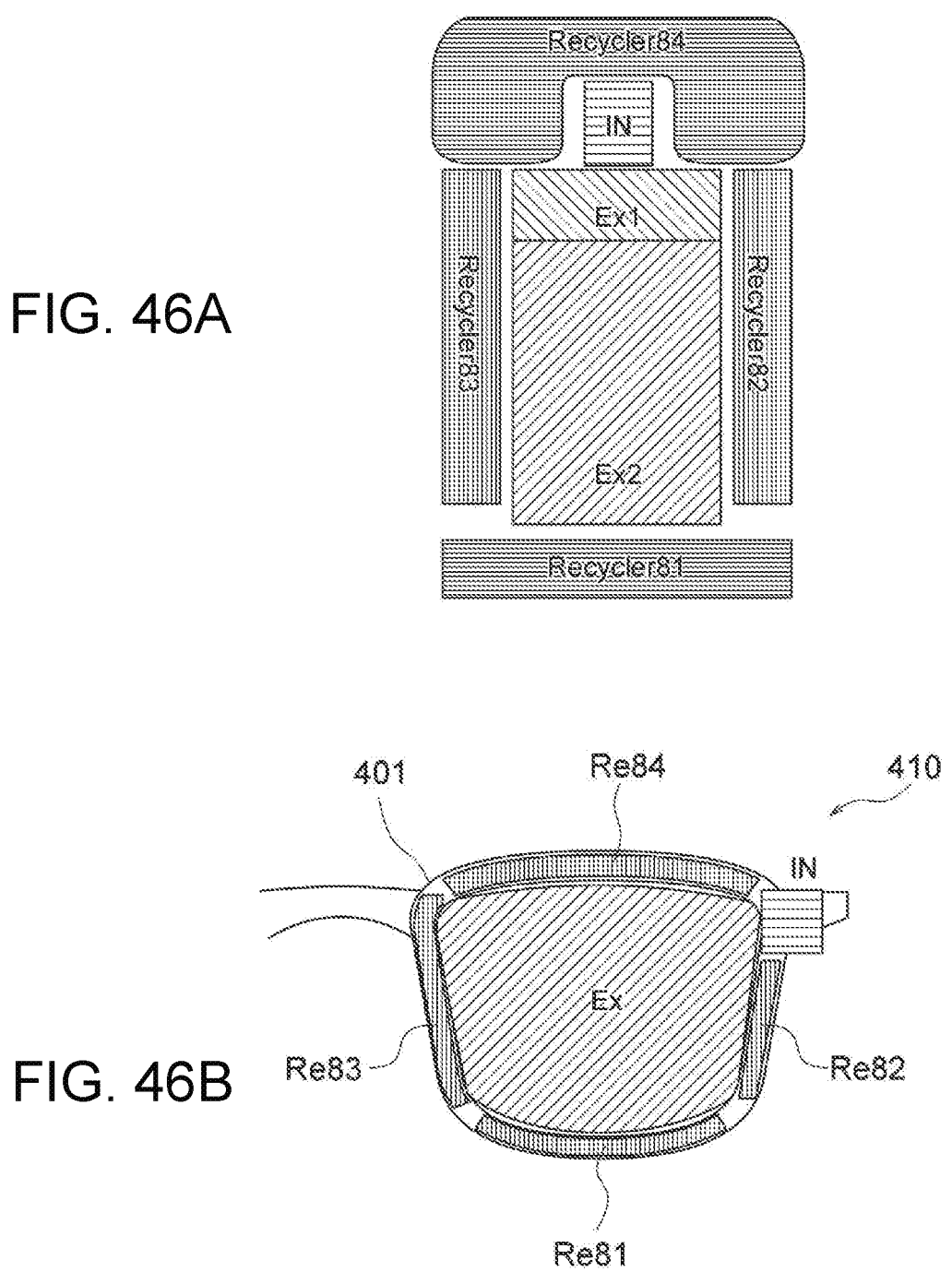

As shown in FIG. 46A, the diffraction gratings according to the present embodiment includes a recycler diffraction grating Re 81 on the lower side of the pupil expansion diffraction grating EX1 and the exit-side diffraction grating EX2, a recycler diffraction grating Re 82 on the right side surface of the pupil expansion diffraction grating EX1 and the exit-side diffraction grating EX2, a recycler diffraction grating Re 83 on the left side surfaces of the pupil expansion diffraction grating EX1 and the exit-side diffraction grating EX2, and a recycler diffraction grating Re 84 arranged covering the incident-side diffraction grating IN on the upper side.

As shown in FIG. 46B, an image display apparatus 410 including the diffraction gratings according to the present embodiment is an eyeglasses type eyewear and includes an eyeglasses frame 401 and an incident-side diffraction grating IN arranged outside the eyeglasses frame 401. Moreover, the image display apparatus 410 includes an exit-side diffraction grating EX2 arranged in a portion in which a lens of the eyeglasses frame 401 is inserted. Then, the recycler diffraction gratings Re 81 to Re 84 are arranged at positions on the eyeglasses frame 401 in the periphery of the exit-side diffraction grating EX2.

The image display apparatus 410 is formed in such an arbitrary shape that the eyeglasses frame 401 completely hides the recycler diffraction gratings Re 81 to Re 84. Therefore, eyeglasses that provide no discomfort as eyeglasses and can provide an image by using its entire lenses can be achieved.

21. Twenty-First Embodiment

Figure 47:
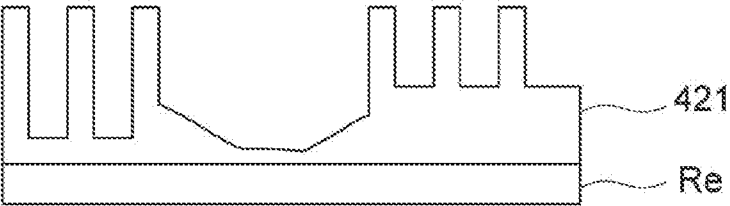
FIG. 47 A schematic diagram showing a configuration example of a recycler diffraction gratings according to a twenty-first embodiment of the present technology.

Next, a configuration example of a recycler diffraction grating according to a twenty-first embodiment of the present technology will be described with reference to FIG. 47. FIG. 47 is a schematic diagram showing a configuration example of the recycler diffraction gratings according to the present embodiment.

As shown in FIG. 47, the recycler diffraction grating Re according to the present embodiment have a residual film 421 on the front surface. The recycler diffraction grating Re can improve the uniformity, the use efficiency, and the like by controlling the residual film 421 formed between the diffraction gratings. It should be noted that all the above-mentioned recycler diffraction gratings can have functions similar to those of the recycler diffraction grating Re 1.

It should be noted that the present technology can also take the following configurations.

(1) An image display apparatus, including:
- an image forming unit that emits image light and converts the image light into parallel light for an angle of view;
- a light guide plate that allows the image light converted by the image forming unit to enter the light guide plate, to travel inside the light guide plate, and to be emitted outward from the light guide plate;
- a first diffraction grating that is arranged in the light guide plate and diffracts the image light entering the light guide plate and causes the image light to travel inside the light guide plate;
- a second diffraction grating that is arranged in the light guide plate and diffracts the image light traveling inside the light guide plate and emits the image light outward from the light guide plate; and
- a recycler diffraction grating that diffracts and recycles the image light emitted from the second diffraction grating.

(2) The image display apparatus according to (1), in which the first diffraction grating, the second diffraction grating, and the recycler diffraction grating have pitches and orientations so that a sum of respective grating vectors becomes zero in accordance with a path of light wished to be recycled.

(3) The image display apparatus according to (1) or (2), in which multiple types of the recycler diffraction grating are arranged in the periphery of the second diffraction grating in accordance with a path of light.

(4) The image display apparatus according to any one of (1) to (3), in which the recycler diffraction grating is arranged in periphery of the first diffraction grating in accordance with a path of light.

(5) The image display apparatus according to any one of (1) to (4), in which the second diffraction grating is a pupil expansion diffraction grating for expanding a pupil and/or an exit-side diffraction grating.

(6) The image display apparatus according to any one of (1) to (5), in which the first diffraction grating and the second diffraction grating are arranged in both surfaces of the light guide plate.

(7) The image display apparatus according to any one of (1) to (6), in which the first diffraction grating and the second diffraction grating are surface-relief diffraction gratings.

(8) The image display apparatus according to any one of (1) to (7), in which the first diffraction grating and the second diffraction grating are holographic optical elements.

(9) The image display apparatus according to any one of (1) to (8), in which the image forming unit includes an image generating unit that emits the image light and an optical system that converts the image light emitted from the image generating unit into parallel light for an angle of view.

(10) The image display apparatus according to any one of (5) to (9), in which the pupil is expanded in one axis direction or two axis directions.

(11) The image display apparatus according to any one of (1) to (10), in which the first diffraction grating, the second diffraction grating, and the recycler diffraction grating are one-dimensional or two-dimensional.

(12) The image display apparatus according to any one of (1) to (11), in which the recycler diffraction grating has a diffraction efficiency distribution.

(13) The image display apparatus according to any one of (1) to (12), in which the second diffraction grating has a diffraction efficiency distribution.

(14) The image display apparatus according to any one of (1) to (13), in which the recycler diffraction grating is multiply-arranged in periphery of the second diffraction grating.

(15) The image display apparatus according to any one of (1) to (14), in which the second diffraction grating has diffraction efficiency with respect to forward incident light and backward incident light coming from the recycler diffraction grating, the diffraction efficiency being suitably controlled so as to effectively diffract light from the recycler diffraction grating.

(16) The image display apparatus according to any one of (1) to (15), in which the image display apparatus is an eyewear attached in vicinity of user's eyes, and the recycler diffraction grating is arranged at a frame position of the eyewear.

(17) An image display method, including:
a step of emitting image light;
a step of causing the emitted image light to enter a light guide plate;
a step of diffracting the image light entering the light guide plate and causing the image light to travel inside the light guide plate;
a step of diffracting the image light traveling inside the light guide plate and emitting the image light outward from the light guide plate; and
a step of recycling the image light traveling inside the light guide plate and emitting the image light outward from the light guide plate.

REFERENCE SIGNS LIST

100, 200, 400, 410 image display apparatus
101 image forming unit
102 projection lens (optical system)
103 light guide plate
104 light input surface
105 light output surface
401 eyeglasses frame
111, 421 residual film
IN incident-side diffraction grating (first diffraction grating)
EX1 pupil expansion diffraction grating (second diffraction grating)
EX2 exit-side diffraction grating (second diffraction grating)
Re 1 to Re 6, Re 11, Re 21 to Re 26, Re 31 to Re 36, Re 41 to Re 46, Re 51 to Re 56, Re 61 to Re 66, Re 71 to Re 76, Re 81 to Re 84, Re recycler diffraction grating
Eye eye

What is claimed is:

1. An image display apparatus, comprising:
an image forming unit that emits image light and converts the image light into parallel light for an angle of view;
a light guide plate, wherein the light guide plate allows the image light converted by the image forming unit to enter the light guide plate through a first surface of the light guide plate, to travel inside the light guide plate, and to be emitted outward from the first surface of the light guide plate;
a first diffraction grating, wherein the first diffraction grating is arranged on the first surface of the light guide plate, and wherein the first diffraction grating diffracts the image light entering the light guide plate and causes the image light to travel inside the light guide plate;
a second diffraction grating, wherein the second diffraction grating is arranged on the first surface of the light guide plate, wherein the second diffraction grating diffracts the image light traveling inside the light guide plate and emits the image light outward from the light guide plate; and
a recycler diffraction grating that diffracts and recycles the image light emitted from the second diffraction grating, wherein the recycler diffraction grating surrounds at least one of the first diffraction grating or the second diffraction grating.

2. The image display apparatus according to claim 1, wherein the first diffraction grating, the second diffraction grating, and the recycler diffraction grating have pitches and orientations so that a sum of respective grating vectors becomes zero in accordance with a path of light wished to be recycled.

3. The image display apparatus according to claim 1, wherein multiple types of the recycler diffraction grating are arranged in a periphery of the second diffraction grating in accordance with a path of light.

4. The image display apparatus according to claim 1, wherein the recycler diffraction grating is arranged in periphery of the first diffraction grating in accordance with a path of light.

5. The image display apparatus according to claim 1, wherein the second diffraction grating is a pupil expansion diffraction grating for expanding a pupil and/or an exit-side diffraction grating.

6. The image display apparatus according to claim 1, wherein the first diffraction grating and the second diffraction grating are surface-relief diffraction gratings.

7. The image display apparatus according to claim 1, wherein the first diffraction grating and the second diffraction grating are holographic optical elements.

8. The image display apparatus according to claim 1, wherein the image forming unit includes an image generating unit that emits the image light and an optical system that converts the image light emitted from the image generating unit into parallel light for an angle of view.

9. The image display apparatus according to claim 5, wherein the pupil is expanded in one axis direction or two axis directions.

10. The image display apparatus according to claim 1, wherein the first diffraction grating, the second diffraction grating, and the recycler diffraction grating are one-dimensional or two-dimensional.

11. The image display apparatus according to claim 1, wherein the recycler diffraction grating has a diffraction efficiency distribution.

12. The image display apparatus according to claim 1, wherein the second diffraction grating has a diffraction efficiency distribution.

13. The image display apparatus according to claim 1, wherein the recycler diffraction grating is multiply-arranged in a periphery of the second diffraction grating.

14. The image display apparatus according to claim 1, wherein the second diffraction grating has diffraction efficiency with respect to forward incident light and backward incident light coming from the recycler diffraction grating, the diffraction efficiency being suitably controlled so as to effectively diffract light from the recycler diffraction grating.

15. The image display apparatus according to claim 1, wherein the image display apparatus is an eyewear attached in vicinity of user's eyes, and the recycler diffraction grating is arranged at a frame position of the eyewear.

16. An image display method, comprising:

a step of emitting image light;

a step of causing the emitted image light to enter a light guide plate through a first surface of the light guide plate;

a step of diffracting the image light entering the light guide plate and causing the image light to travel inside the light guide plate;

a step of diffracting the image light traveling inside the light guide plate and emitting the image light outward from the light guide plate; and a step of recycling the image light traveling inside the light guide plate and emitting the image light outward from the first surface of the light guide plate, wherein the step of recycling the image light is performed by a recycler that surrounds a diffraction grating.

17. The image display apparatus according to claim 1, wherein the first diffraction grating diffracts the image light before the image light enters the light guide plate.

18. The image display apparatus according to claim 17, wherein the second diffraction grating diffracts the image light after the image light has been emitted outward from the first surface of the light guide plate.

19. An image display apparatus, comprising:

an image forming unit that emits image light and converts the image light into parallel light for an angle of view;

a light guide plate, wherein the light guide plate allows the image light converted by the image forming unit to enter the light guide plate through a first surface of the light guide plate, to travel inside the light guide plate, and to be emitted outward from the first surface of the light guide plate;

a first diffraction grating, wherein the first diffraction grating is arranged on the first surface of the light guide plate, and wherein the first diffraction grating diffracts the image light entering the light guide plate and causes the image light to travel inside the light guide plate;

a second diffraction grating, wherein the second diffraction grating is arranged on the first surface of the light guide plate, wherein the second diffraction grating diffracts the image light traveling inside the light guide plate and emits the image light outward from the light guide plate; and a recycler diffraction grating that diffracts and recycles the image light emitted from the second diffraction grating, wherein the recycler diffraction grating is disposed around a periphery of the second diffraction grating.

* * * * *